(12) United States Patent
Bolouri

(10) Patent No.: US 11,613,386 B1
(45) Date of Patent: Mar. 28, 2023

(54) VERTICAL LANDING APPARATUS AND METHOD

(71) Applicant: Jalal Bolouri, East York (CA)

(72) Inventor: Jalal Bolouri, East York (CA)

(*) Notice: Subject to any disclaimer, the term of this patent is extended or adjusted under 35 U.S.C. 154(b) by 0 days.

(21) Appl. No.: 17/708,478

(22) Filed: Mar. 30, 2022

(51) Int. Cl.
*B64G 1/62* (2006.01)

(52) U.S. Cl.
CPC .................................. *B64G 1/62* (2013.01)

(58) Field of Classification Search
CPC .............................. B64G 1/62; B64G 2700/24
See application file for complete search history.

(56) References Cited

U.S. PATENT DOCUMENTS

| | | | | |
|---|---|---|---|---|
| 2,373,385 A * | 4/1945 | Davie, Jr. | ............... | B64C 25/22 91/41 |
| 3,175,789 A * | 3/1965 | Blumrich | ................ | B64G 1/62 244/100 R |
| 3,191,316 A * | 6/1965 | Dryden | .................... | B64G 1/62 434/34 |
| 4,295,413 A * | 10/1981 | Kamimura | ............ | F15B 15/261 92/24 |
| 5,035,377 A * | 7/1991 | Buchelt | ................. | B64C 11/001 416/223 R |
| 5,308,023 A * | 5/1994 | Kress | ..................... | B64C 25/10 244/102 R |
| 5,366,181 A * | 11/1994 | Hansen | .................... | B64G 1/62 244/100 R |
| 5,927,653 A * | 7/1999 | Mueller | .................... | B64G 5/00 244/164 |
| 6,227,494 B1 * | 5/2001 | Turner | ..................... | B64G 1/62 244/172.6 |
| 8,408,497 B2 | 4/2013 | Boelitz et al. | | |
| 8,678,321 B2 | 3/2014 | Bezos et al. | | |
| 8,729,442 B2 | 5/2014 | Boelitz et al. | | |
| 8,991,764 B2 * | 3/2015 | Auger | ..................... | B64G 1/62 244/158.9 |

(Continued)

FOREIGN PATENT DOCUMENTS

| | | | | |
|---|---|---|---|---|
| CA | 2798601 A1 * | 6/2013 | ............ | B64C 25/00 |
| CN | 102167166 A * | 8/2011 | | |

(Continued)

*Primary Examiner* — Donald J Wallace
*Assistant Examiner* — Jalal C Coduroglu
(74) *Attorney, Agent, or Firm* — Bereskin & Parr LLP/S.E.N.C.R.L., s.r.l.

(57) ABSTRACT

A vertical landing apparatus comprises a body, at least three legs, and at least three leg locks coupled to the body. The body comprises a body lower end and at least three leg housings. Each leg housing comprises a passage extending longitudinally upwardly from a leg housing lower opening. Each leg is translatable within the passage of a respective leg housing between deployed and leg locking positions. Each leg comprises a leg lower end that is longitudinally outboard of the body lower end. Each leg comprises a longitudinally outboard extent from the body lower end to the lower leg end that is longer when in the deployed position than the leg locking position. Each leg lock is associated with a respective leg and configured to move between a locked position in which translation of the leg is prevented and a disengaged position in which translation of the leg is allowed.

16 Claims, 17 Drawing Sheets

(56) References Cited

U.S. PATENT DOCUMENTS

| | | | |
|---|---|---|---|
| 9,033,276 B1* | 5/2015 | Calvert | B64C 25/10 244/102 R |
| 9,592,908 B2* | 3/2017 | Gentry | B64C 25/10 |
| 9,994,307 B2* | 6/2018 | Nguyen | B64C 39/024 |
| 10,040,548 B2 | 8/2018 | Alzahrani | |
| 10,266,282 B2 | 4/2019 | Featherstone et al. | |
| 10,676,177 B1* | 6/2020 | Costello | B64C 25/001 |
| 10,899,436 B2 | 1/2021 | Gentry | |
| 2002/0113165 A1* | 8/2002 | Moshier | B64C 39/026 244/4 A |
| 2007/0051848 A1* | 3/2007 | Mantych | A63H 27/14 244/100 R |
| 2011/0163201 A1* | 7/2011 | Buchwald | B64G 1/62 244/100 R |
| 2012/0153077 A1* | 6/2012 | Balemboy | B64G 1/62 244/100 R |
| 2012/0298796 A1* | 11/2012 | Carreker | B64G 1/22 244/100 R |
| 2015/0166201 A1* | 6/2015 | Carreker | B64G 1/22 244/102 SS |
| 2016/0144944 A1* | 5/2016 | Goings | E05F 11/54 244/129.5 |
| 2016/0221667 A1* | 8/2016 | Bennett | F16H 25/18 |
| 2017/0190446 A1* | 7/2017 | Williams, Sr. | B64G 1/002 |
| 2017/0369162 A1 | 12/2017 | Alzahrani | |
| 2018/0170529 A1* | 6/2018 | Schmidt | B64C 13/16 |
| 2019/0359326 A1* | 11/2019 | Marles | B64D 45/0005 |
| 2020/0039629 A1* | 2/2020 | Bosworth | B64C 39/008 |
| 2021/0387753 A1* | 12/2021 | D'Souza | B64G 1/222 |
| 2021/0403146 A1* | 12/2021 | Atsumi | B64C 1/22 |
| 2022/0063844 A1* | 3/2022 | Alhubail | B64G 1/14 |

FOREIGN PATENT DOCUMENTS

| | | | | |
|---|---|---|---|---|
| CN | 102198866 A | * | 9/2011 | |
| CN | 103350758 A | | 10/2013 | |
| CN | 103350758 A | * | 10/2013 | B64G 1/16 |
| CN | 103950434 A | * | 7/2014 | |
| CN | 104943875 A | * | 9/2015 | B64G 1/22 |
| CN | 104943875 B | | 11/2016 | |
| CN | 105422788 B | | 5/2018 | |
| CN | 207607642 U | | 7/2018 | |
| CN | 109436380 A | | 3/2019 | |
| CN | 109436380 A | * | 3/2019 | B64G 1/62 |
| CN | 209241310 U | * | 8/2019 | |
| CN | 110271694 A | | 9/2019 | |
| CN | 111017269 A | | 4/2020 | |
| CN | 112027116 A | * | 12/2020 | B64G 1/244 |
| CN | 112027116 A | | 12/2020 | |
| CN | 112977806 A | | 6/2021 | |
| CN | 113071715 A | * | 7/2021 | |
| DE | 19701759 A1 | * | 10/1997 | B60G 13/008 |
| GB | 2309282 A | * | 7/1997 | B60G 13/008 |
| JP | 2008119820 A | * | 5/2008 | |
| KR | 102077969 B1 | | 2/2020 | |
| RU | 2521451 C2 | * | 6/2014 | |
| RU | 2665154 C1 | | 8/2018 | |
| WO | 2010105925 A1 | | 9/2010 | |
| WO | WO-2010105925 A1 | * | 9/2010 | B64G 1/16 |
| WO | WO-2011096942 A1 | * | 8/2011 | B64G 1/22 |
| WO | WO-2015069755 A1 | * | 5/2015 | B64F 1/125 |
| WO | 2018125942 A1 | | 7/2018 | |
| WO | WO-2019017343 A1 | * | 1/2019 | A61F 2/68 |
| WO | 2019067873 A1 | | 4/2019 | |
| WO | WO-2019067873 A1 | * | 4/2019 | B64C 25/001 |

* cited by examiner

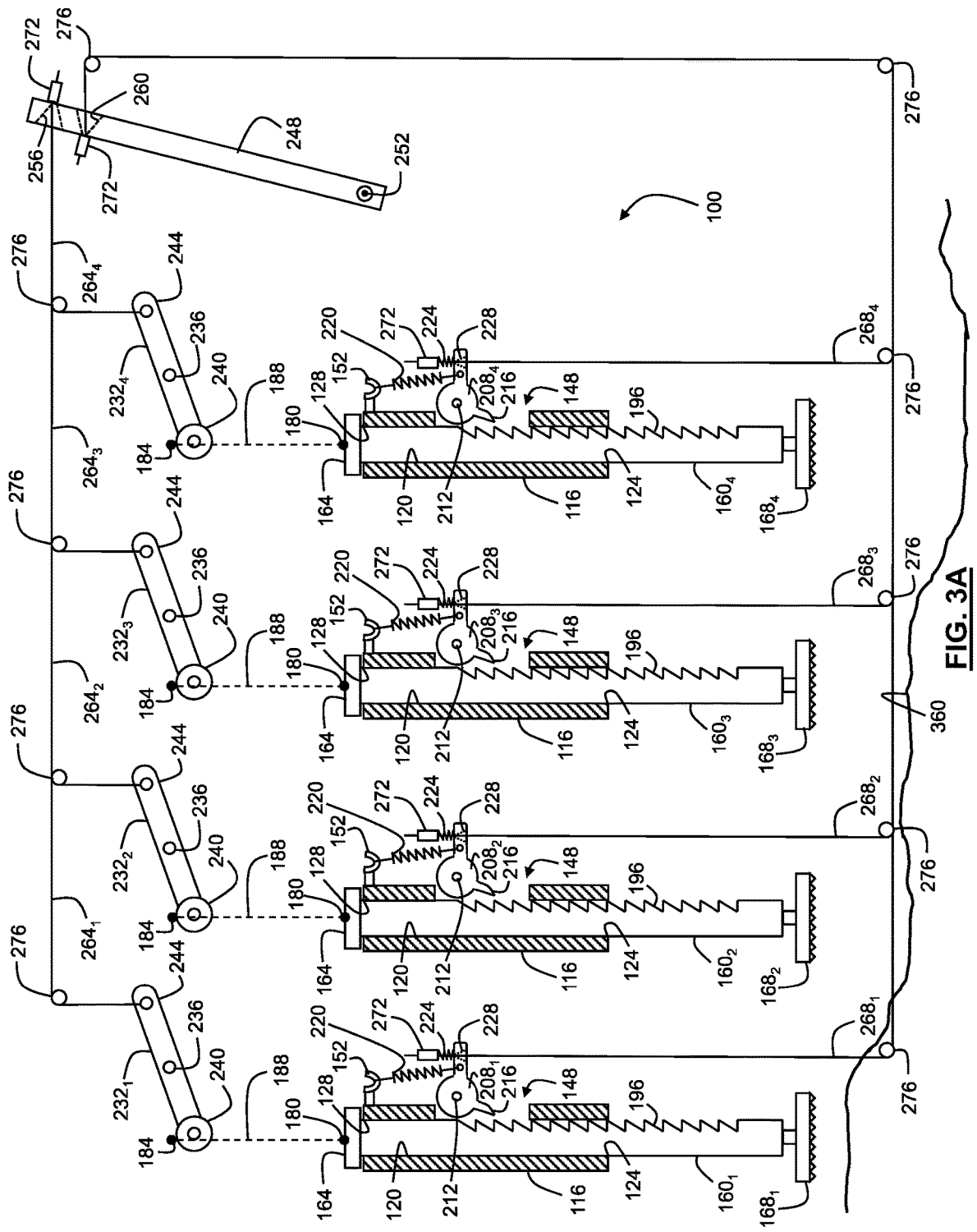

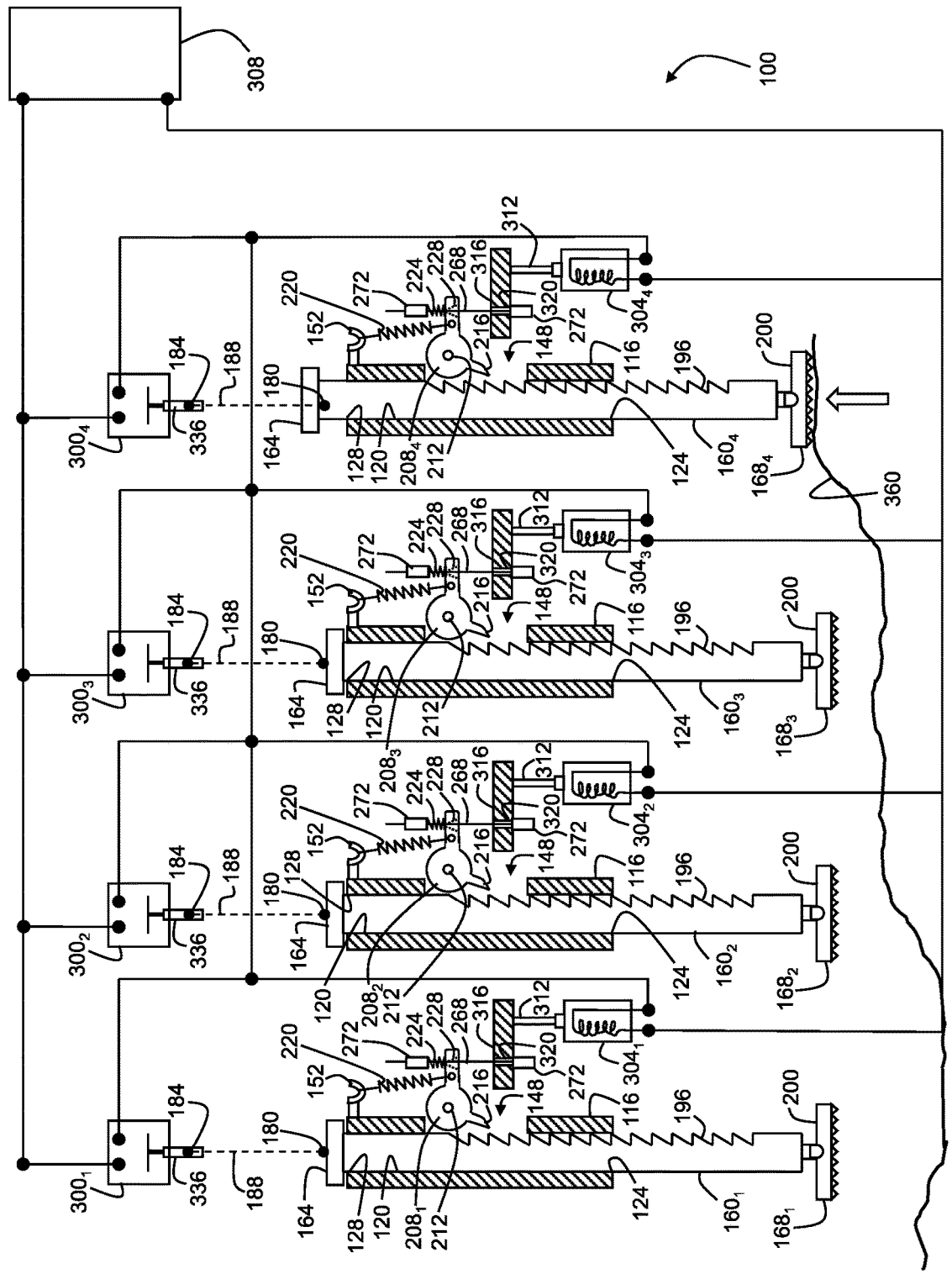

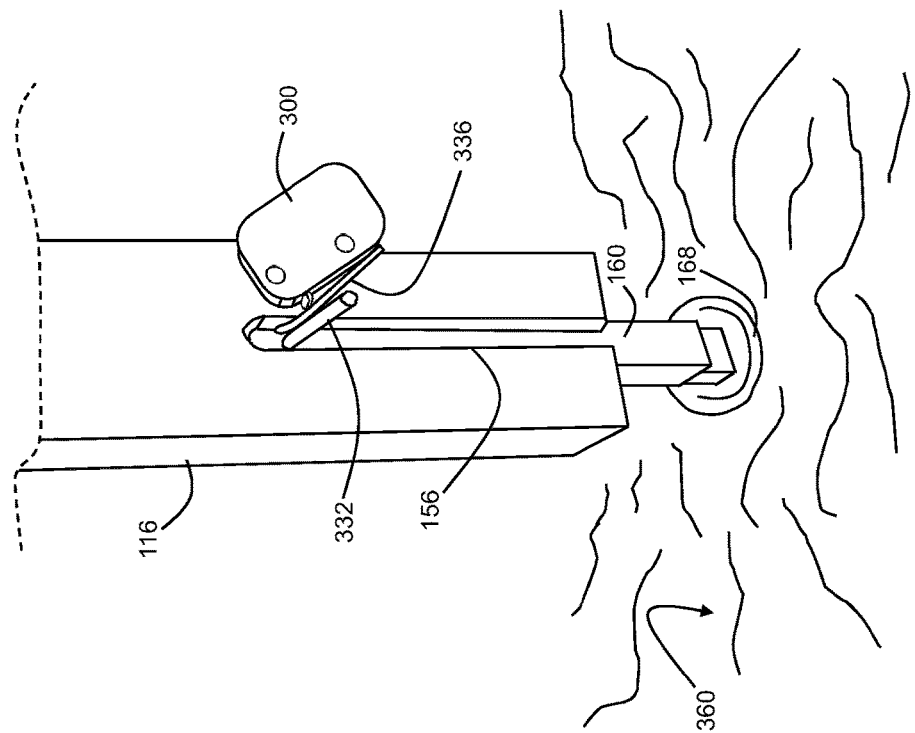
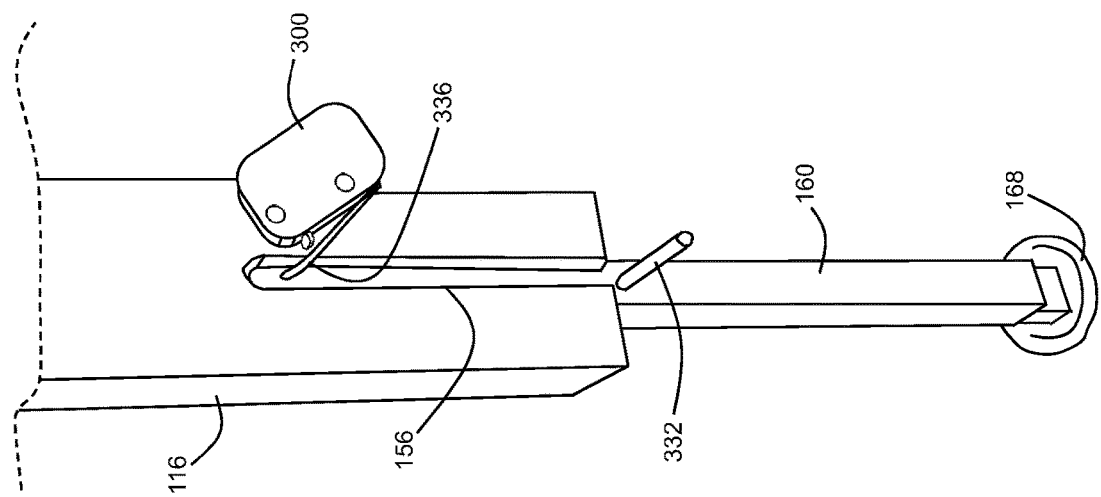
FIG. 6B
FIG. 6A

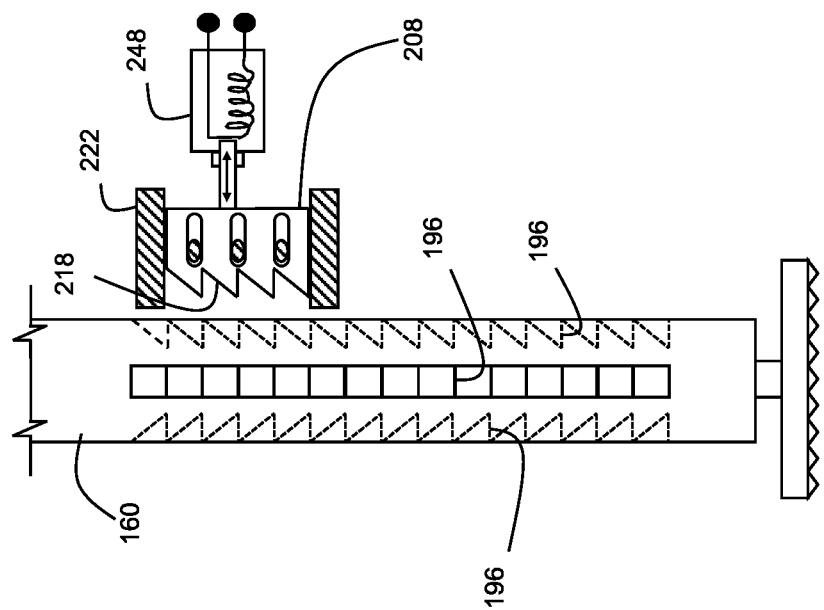

VERTICAL LANDING APPARATUS AND METHOD

FIELD

This disclosure relates generally to the field of aeronautics, and more specifically to a vertical landing apparatus.

INTRODUCTION

The following paragraphs are not an admission that anything discussed in them is prior art or part of the knowledge of persons skilled in the art.

Spacecraft have been used for many years to transport human and non-human payloads into space. There are various types of spacecrafts (e.g., booster rockets, space capsules, etc.).

A booster rocket may be used to launch a spacecraft into low Earth orbit (or beyond Earth orbit in other cases). In some cases, a booster rocket is used to launch unmanned space probes and satellites into orbit, or to deliver supplies and personnel to the International Space Station. More recently, companies like SpaceX, Blue Origin and Virgin Galactic are working to make widespread commercial space travel a reality. The booster rocket may be the first stage of a multistage launch vehicle. Alternatively, the booster may be a shorter-burn rocket used in parallel with a longer-burning rocket to supplement the spacecraft's takeoff thrust. Once its fuel is expended, the booster rocket may separate from the spacecraft and fall back to earth. Following booster separation, the remaining spacecraft continues flight.

Space capsules are a commonly used form of spacecraft for returning a payload and/or personnel to the Earth's surface. Capsules typically use a blunt-body design to re-enter the Earth's atmosphere without wings. Capsules may be distinguished from satellites by their ability to return a payload and/or crew to the Earth's surface.

Despite significant advancements, manned and unmanned space flight remains an expensive undertaking. Reuse of parts can significantly offset the cost. When a separated booster rocket lands safely on land, it can at least partially be reused (or completely reused in some cases). The same applies to a space capsule that lands safely on land. One benefit related to the reusability of these spacecrafts is the potential to provide low-cost access to space.

One continual challenge associated with spacecraft, such as rocket boosters and space capsules, is their landing. The process of safely landing a spacecraft, in a top-over-bottom orientation, through vertical descent relative to a landing surface, consumes a significant amount of energy and requires exacting precision to avert failure. The vertical landing process is made more challenging when the landing surface is irregular (e.g., sloped surface, contains obstacles, etc.—conditions which may be more common when landing on the Moon or Mars). This challenge also presents in other types of vertical landing vehicles, e.g., helicopters, drones, etc.).

SUMMARY

The following is intended to introduce the reader to the detailed description that follows and not to define or limit the claimed subject matter.

Examples herein relate to a vertical landing apparatus comprising a body and at least three landing legs that are translatable with respect to the body. The vertical landing apparatus may be integrated with various types of vertical landing vehicle (e.g., spacecrafts, helicopters, drones, etc.). As used herein, a "vertical landing vehicle" may by any manned or unmanned vehicle that lands by descending vertically, in a top-over-bottom orientation, relative to a landing surface.

Generally, the vertical landing apparatus is configured to secure all landing legs in position when any one of the landing legs is in its leg locking position. Each landing leg can translate upwardly, with respect to the body, from a deployed position to a leg locking position. A landing process begins with each landing leg in its deployed position. As the vertical landing apparatus descends relative to a landing surface, the landing legs translate upwardly toward respective leg locking positions in response to contact with the landing surface. The vertical landing apparatus is configured to lock all landing legs when a first one of the landing legs reaches (e.g., translates to) its respective leg locking position. When locked, each landing leg is prevented from further translation with respect to the body. The landing process is complete once all landing legs are locked in position.

In accordance with an aspect, there is provided a vertical landing apparatus. The vertical landing apparatus comprises a body, at least three landing legs translatable with respect to the body, and at least three leg locks coupled to the body. The body comprises a body lower end, and at least three leg housings. Each of the leg housings comprises an internal passage extending longitudinally upwardly from a leg housing lower opening. Each of the landing legs is translatable within the internal passage of a respective one of the leg housings between a deployed position and a leg locking position. Each of the landing legs comprises a leg lower end that is longitudinally outboard of the body lower end when in the deployed and leg locking positions. Each of the landing legs comprises a longitudinally outboard extent from the body lower end to the lower leg end that is longer when in the deployed position than the leg locking position. Each of the leg locks is associated with a respective one of the landing legs and configured to move between a locked position in which translation of the respective one of the landing legs is prevented and a disengaged position in which translation of the respective one of the landing legs is allowed. As the apparatus descends relative to a landing surface, contact between the leg lower ends and the landing surface causes the landing legs to translate toward the leg locking position. Each of the leg locks is configured to move from the disengaged position to the locked position in response to a first one of the landing legs reaching the leg locking position.

In accordance with another aspect, there is provided a vertical landing apparatus. The vertical landing apparatus comprises a body, at least three landing legs translatable with respect to the body, and at least three leg locks coupled to the body. The body comprises a body lower end, and at least three leg housings. Each of the leg housings comprises an internal passage extending longitudinally upwardly from a leg housing lower opening. Each of the landing legs is translatable within the internal passage of a respective one of the leg housings between a deployed position and a leg locking position. Each of the landing legs comprises a leg lower end that is longitudinally outboard of the body lower end when in the deployed and leg locking positions. Each of the landing legs comprises a longitudinally outboard extent from the body lower end to the lower leg end that is longer when in the deployed position than the leg locking position. Each of the leg locks is associated with a respective one of the landing legs and configured to move between a locked position in which translation of the respective one of the landing legs is prevented and a disengaged position in which translation of the respective one of the landing legs is allowed.

In accordance with another aspect, there is provided a method of landing an apparatus comprising at least three landing legs. The method involves: descending the apparatus relative to a landing surface; while said descending, contacting a lower end of each of the landing legs with the landing surface whereby each of the landing legs translate upwardly and independently of one another; and locking each of the landing legs in position when a first one of the landing legs reaches a leg locking position.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings:

FIGS. 3A-3E are partial schematic views of a vertical landing apparatus that illustrate an exemplary landing sequence;

FIGS. 5A-5E are partial schematic views of a vertical landing apparatus that illustrate another exemplary landing sequence;

FIGS. 6A-6B are partial perspective views of an example landing leg and corresponding leg housing, with the landing leg shown in a deployed position and a leg locking position, respectively;

FIG. 8 is a partial schematic view of an example landing leg and corresponding leg lock.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Some elements herein may be identified by a part number, which is composed of a base number followed by an alphabetical or subscript-numerical suffix (e.g., 116a, or $116_1$). Multiple elements herein may be identified by part numbers that share a base number in common and that differ by their suffixes (e.g., $116_1$, $116_2$, and $116_3$). All elements with a common base number may be referred to collectively or generically using the base number without a suffix (e.g., 116).

Reference is first made to FIGS. 1A-1C and FIGS. 2A-2B. Examples herein relate to a vertical landing apparatus 100 comprising a body 106 and at least three landing legs 160 that are translatable with respect to the body 106. The vertical landing apparatus 100 may be integrated with various types of vertical landing vehicle (e.g., spacecrafts, helicopters, drones, etc.). As used herein, a "vertical landing vehicle" may by any manned or unmanned vehicle that lands by descending vertically, in a top-over-bottom orientation, relative to a landing surface.

Generally, the vertical landing apparatus 100 is configured to secure all landing legs 160 in position when any one of the landing legs 160 is in its leg locking position. Each landing leg 160 can translate upwardly, with respect to the body 106, from a deployed position to a leg locking position. A landing process begins with each landing leg 160 in its deployed position. As the vertical landing apparatus 100 descends relative to a landing surface, the landing legs 160 translate upwardly toward respective leg locking positions in response to contact with the landing surface. The vertical landing apparatus 100 is configured to lock all landing legs 160 when a first one of the landing legs 160 reaches (e.g., translates to) its respective leg locking position. When locked, each landing leg 160 is prevented from further translation with respect to the body 106. The landing process is complete once all landing legs 160 are locked in position.

Figure 1A:
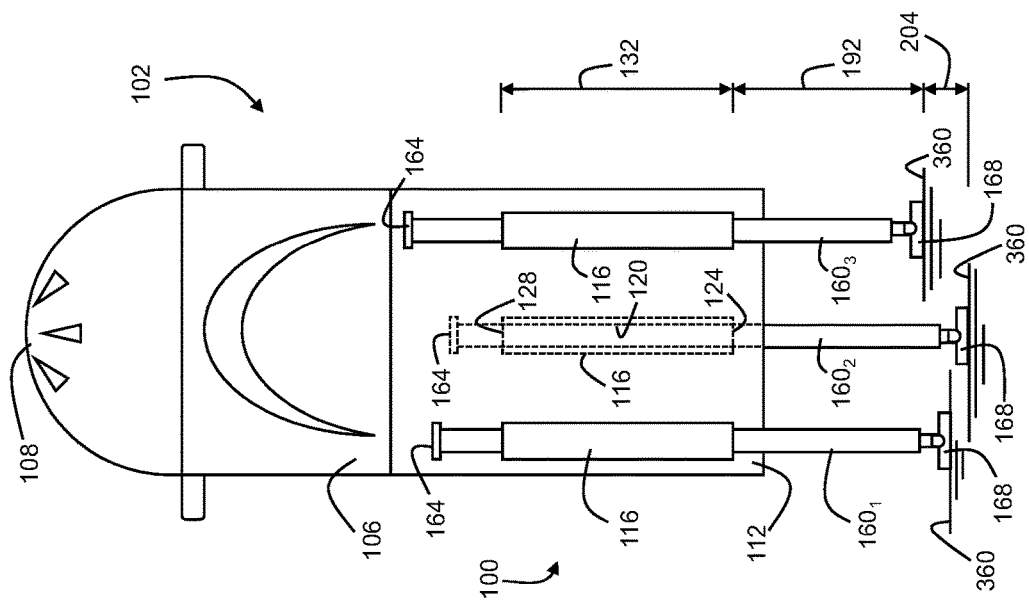
FIG. 1A is a side view of an example of a booster rocket comprising a vertical landing apparatus.
Figure 1B:
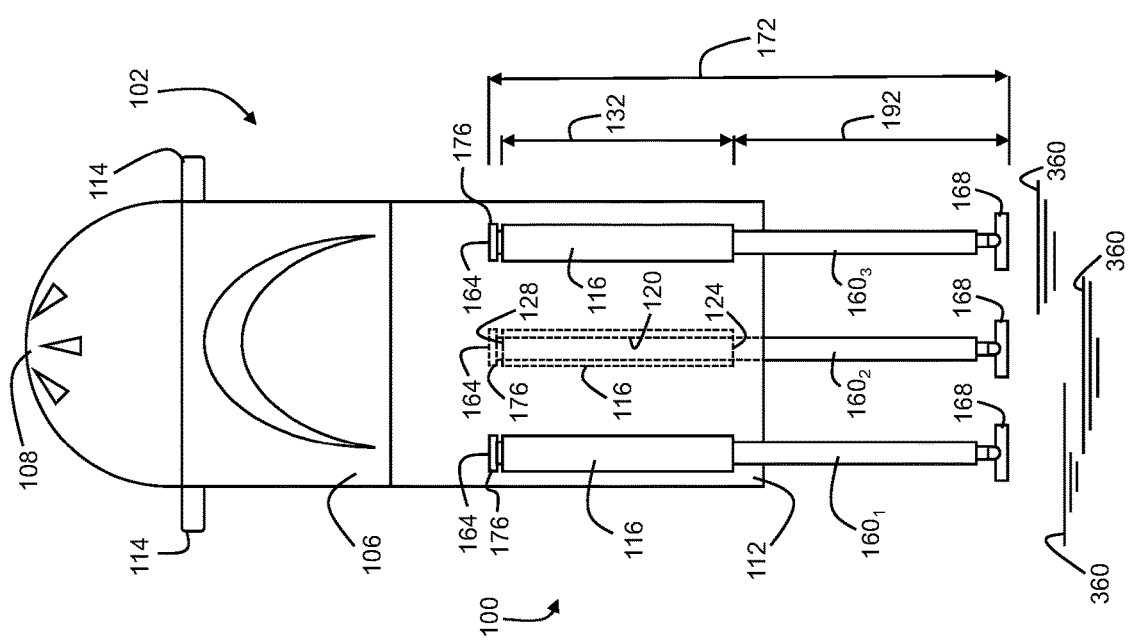
FIG. 1B is a side view of the booster rocket of FIG. 1A, in which the booster rocket has landed on an uneven surface.
Figure 1C:
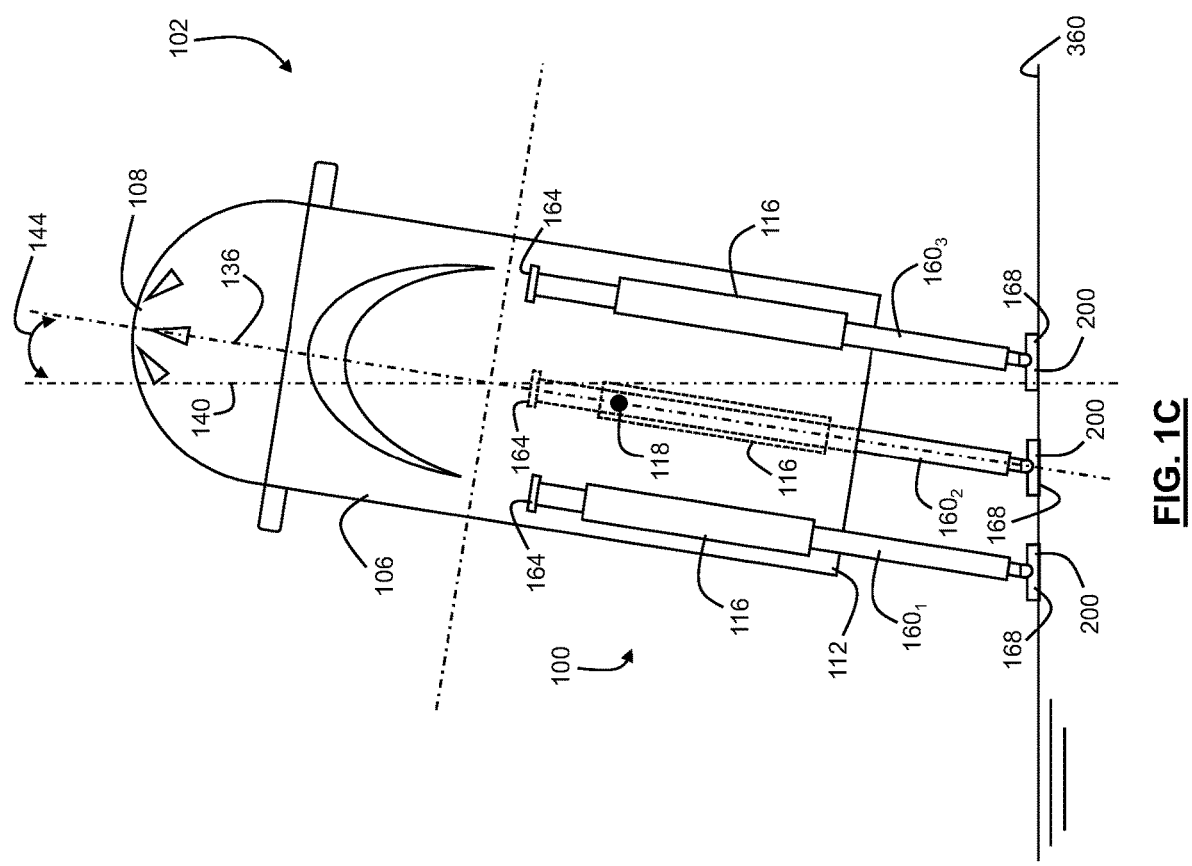
FIG. 1C is a side view of the booster rocket of FIG. 1A, in which the booster rocket has safely landed on a surface but is not perpendicular to the landing surface.
Figures 2A, 2B:
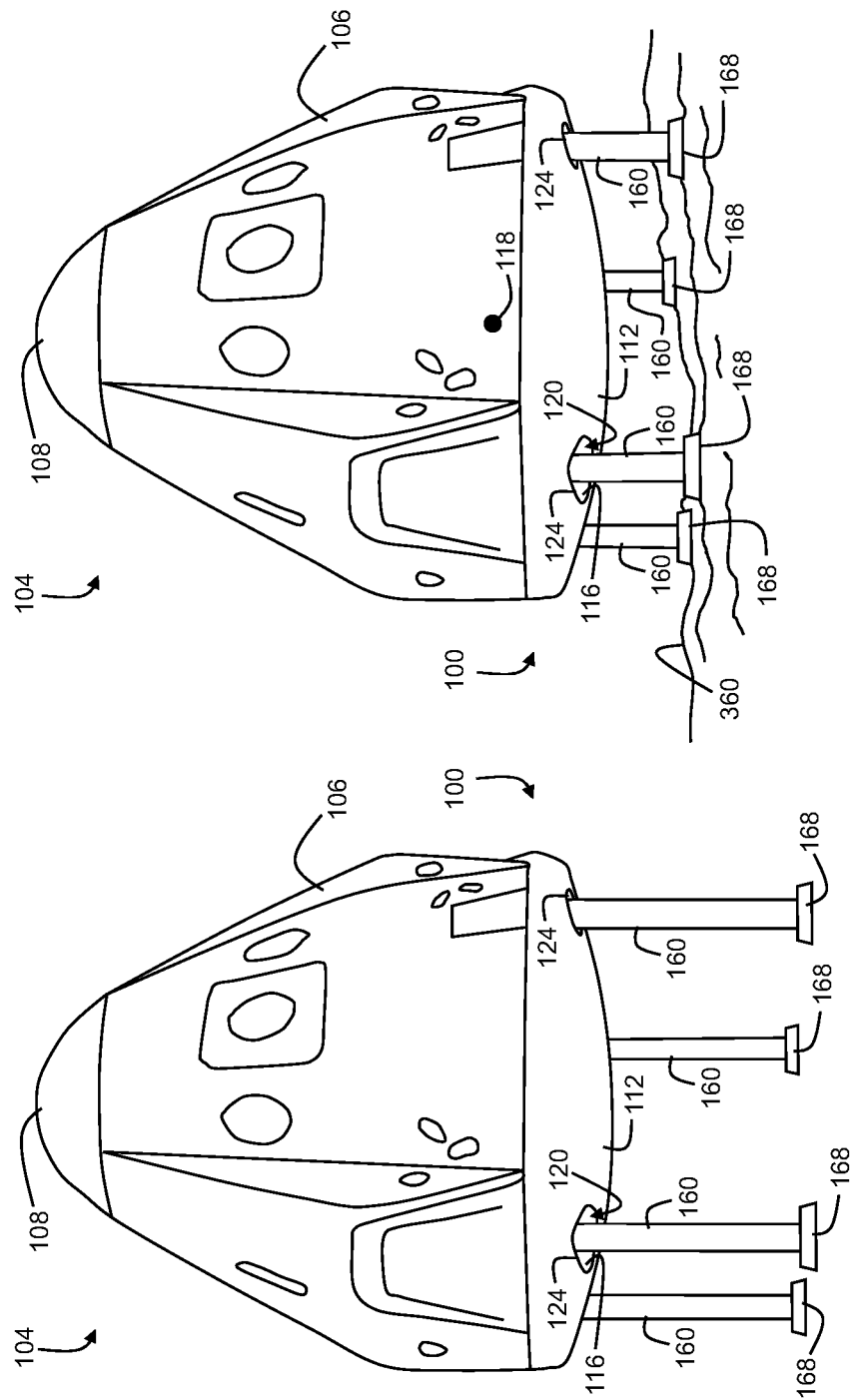
FIG. 2A is a perspective view of an example of a space capsule comprising a vertical landing apparatus.
FIG. 2B is a perspective view of the space capsule of FIG. 2A, in which the space capsule has landed on an uneven surface.

As described below, spacecrafts (e.g., booster rockets, space capsules, etc.) may benefit from use of the vertical landing apparatus 100 due their substantial size and weight. Spacecrafts generally require landing apparatuses that are robust and rigid enough to not buckle or give way when supporting considerable weight. In some cases, a spacecraft comprising the vertical landing apparatus 100 may weigh over 5 tons. In other cases, a spacecraft comprising the vertical landing apparatus may weight over 10 tons. FIGS. 1A-1C illustrate an exemplary booster rocket 102 that comprises the vertical landing apparatus 100. FIGS. 2A-2B illustrate an exemplary space capsule 104 that comprises the vertical landing apparatus 100.

Referring to FIGS. 1A-1B, the body 106 comprises a body upper end 108, a body lower end 112 and three leg housings 116. Each leg housing 116 comprises an internal passage 120 that extends longitudinally upwardly from a leg housing lower opening 124. Each landing leg 160 is translatable within the internal passage 120 of a respective one of the leg housings 116 between a deployed position and a leg locking position. Accordingly, the number of leg housings 116 corresponds to the number of landing legs 160. In alternative examples, the vertical landing apparatus 100 may comprise more than three landing legs 160 (e.g., 4 to 9 landing legs, or more). For example, the vertical landing apparatus 100 of FIGS. 2A-2B comprises four leg landing legs 160 and four corresponding leg housings 116.

The leg housings 116 may be positioned and/or distributed in various ways. In one example, as illustrated in FIGS. 1A-1C, the leg housings 116 are externally mounted to the body 106 and evenly distributed around the outer perimeter of body 106. It will be appreciated that an even distribution of the leg housings 116 may provide greater stability than an uneven distribution. In another example, as illustrated in FIGS. 2A-2B, the leg housings 116 are integral with the body 106. As shown, the internal passage 120 of each leg housing 116 extends upwardly from the body lower end 112. Accordingly, the leg housing lower opening 124 of each leg housing 116 coincides with the body lower end 112. In such a configuration, each landing leg 160 retracts into the body 106 as it moves upwardly toward its leg locking position.

Each landing leg 160 comprises a leg upper end 164, a leg lower end 168, and a leg length 172 between the leg upper and lower ends 164, 168. In some examples, the leg length 172 of each of the landing legs 160 is at least 2 m. More preferably, the leg length 172 is at least 3 m (e.g., at least 4 m, at least 5 m, at least 6 m, or more). In alternative examples, the leg length 172 may be below 2 m (e.g., 0.5 m to 2 m). The landing legs 160 may have any cross-sectional shape (e.g., circular, ovular, rectangular, triangular, hexagonal, etc.). The cross-sectional shape of each landing leg 160 may correspond with the cross-sectional shape of the respective internal passage 120 such that the landing leg 160 may translate within the internal passage 120.

In the illustrated example of FIGS. 1A-1C, the internal passage 120 of each leg housing 116 extends longitudinally between the leg housing lower opening 124 and a leg housing upper opening 128. In such a configuration, each landing leg 160 may pass through the respective leg housing 116 at the leg housing upper opening 128. In an alternative embodiment, the leg housings 116 may not have a leg housing upper opening. In these examples, the leg upper end 164 is confined within the internal passage 120 (i.e., the leg upper end 164 does not pass through the upper end of the leg housing 116).

FIG. 1A illustrates the vertical landing apparatus 100 descending toward a landing surface 360 with each landing leg 160 in their deployed position. Each landing leg 160 remains in their deployed position before contact with the landing surface 360. As the vertical landing apparatus 100 continues to descend, the leg lower end 168 of each landing leg 160 contacts the landing surface 360. In response, each landing leg 160 translates upwardly (away from its deployed position and toward its leg locking position). The landing legs 160 translate (e.g., slide) independently of one another. The landing legs 160 are unlocked (i.e., free to translate up and down within respective leg housings 116) when none of the landing legs 160 are in their respective leg locking position.

As exemplified in FIGS. 1A-1B, the landing surface 360 may be uneven (e.g., have a non-uniform elevation). In these situations, the leg lower end 168 of each landing leg 160 touches down on the landing surface 360 at different times. That is, the landing leg 160 positioned over the portion of the landing surface 360 with the highest elevation will touch down first, the landing leg 160 positioned over the portion of the landing surface 360 with the second highest elevation will touch down next, and so on, until all landing legs 160 have contacted the landing surface 360. Accordingly, at any given time after first contact with the landing surface 360, each landing leg 160 may have a different elevation compared the others (e.g., each landing leg 160 may have translated a different amount according to where on the landing surface 360 it touched down).

As the vertical landing apparatus 100 continues to descend (i.e. gets closer to the landing surface 360), one of the landing legs 160 will eventually translate to its respective leg locking position. In response to that landing leg 160 reaching its leg locking position, all landing legs 160 are locked in their current position. The locked landing legs 160 are prevented from any further translation relative to the body 106. The landing legs 160 can be locked in various ways to prevent further translation (examples are described herein below with respect to FIGS. 3A-3E and FIGS. 5A-5E). The landing process is complete once all landing legs 160 are locked in position.

FIG. 1B illustrates the vertical landing apparatus 100 after landing on the uneven landing surface 360. Comparing FIG. 1B to FIG. 1A shows that the landing leg $160_3$ has translated upwardly from its deployed position (FIG. 1A) to its leg locking position (FIG. 1B). In response to the landing leg $160_3$ reaching its leg locking position, all landing legs $160_1$, $160_2$ and $160_3$ are locked in position (i.e., prevented from further translational movement with respect to the body 106). As shown in FIG. 1B, the landing legs $160_1$ and $160_2$ have not translated to the same extent as landing leg $160_3$ due to the elevation differences of the landing surface 360. Only the landing leg $160_3$ has translated far enough to reach its leg locking position. The landing legs $160_1$ and $160_2$ have translated to positions intermediate of their respective deployed and leg locking positions. Nevertheless, the landing legs $160_1$ and $160_2$ are locked in these intermediate positions.

In some examples, the vertical landing apparatus 100 may allow for a stable landing on an uneven landing surface (e.g., see landing surface 360 of FIG. 1B). As used herein, an "uneven landing surface" may be any landing surface in which there is a surface elevation difference 204 between at least two of the landing legs 160. An uneven surface may include sloped and undulating surfaces and/or surfaces that contain obstacles. In at least one embodiment, the vertical landing apparatus 100 can successfully land when the surface elevation difference 204 between any two of the landing legs 160 is between 0 and 3 m. In other examples, the vertical landing apparatus 100 can successfully land when the surface elevation difference 204 between any two of the landing legs 160 is greater than 3 m (e.g., between 0 and 4 m, or between 0 and 5 m). The ability of the vertical landing apparatus 100 to land on uneven landing surfaces 360 gives it the flexibility to land on surfaces not previously conditioned to be landing surfaces (e.g., the Moon, Mars, or emergency landing sites on the Earth).

All else being equal, the greater the distance that the landing legs 160 can translate between their deployed and leg locking positions, the greater the allowable surface elevation difference 204 between any two landing legs 160. As an example, with landing legs 160 that can translate 2 m between deployed and leg locking positions, the vertical landing apparatus 100 can stably land on a landing surface 360 that has a surface elevation difference 204 of up to 2 m between any two landing legs 160. As another example, with landing legs 160 that can translate 4 m between deployed and leg locking positions, the vertical landing apparatus 100 can stably land on a landing surface 360 that has a surface elevation difference 204 of up to 4 m between any two landing legs 160.

Alternatively, or in addition to allowing for a stable landing on an uneven surface, the vertical landing apparatus 100 may simplify the landing process. As exemplified in FIG. 1C, the vertical landing apparatus 100 allows for a stable landing when the body 106 is not completely perpendicular to the landing surface 360. FIG. 1C illustrates a tilt angle 144 between a longitudinal axis 136 of the vertical landing apparatus 100 and a vertical projection 140 of the landing surface 360. In at least one embodiment, the vertical landing apparatus 100 can stably land when the tilt angle 144 is between 0 and 25 degrees (e.g., at least 5 degrees, at least 10 degrees, at least 15 degrees, at least 20 degrees). In other examples, the vertical landing apparatus 100 may achieve a stable landing at a tilt angle 144 between 0 and 35 degrees. By not requiring the longitudinal axis 136 to be perfectly perpendicular to the landing surface 360, the vertical landing apparatus 100 can simplify the landing process (e.g., less precise orientation is required).

To accommodate stable landings at "high" tilt angles 144 (e.g., 10-30 degrees), the vertical landing apparatus 100 may be provided with additional landing legs 160. That is, a vertical landing apparatus 100 with six landing legs 160 may achieve a stable landing at a higher tilt angle 144 than a vertical landing apparatus 100 with three landing legs 160.

The center of gravity of the vertical landing vehicle can influence the upper limit of the tilt angle 144 for a stable landing. All else being equal, a vertical landing vehicle with a lower center of gravity will allow for a stable landing at a greater tilt angle than one with a higher center of gravity. For example, FIG. 1C illustrates the booster rocket 102 having a center of gravity 118. In comparison, FIG. 2B illustrates the space capsule 104 having a center of gravity 118. Owing to its blunt shape, the space capsule 104 has a lower center of gravity 118 than the booster rocket 102. Accordingly, in this example, the vertical landing apparatus 100 may allow for a stable landing at a higher tilt angle 144 when integrated with the space capsule 104 than when integrated with the booster rocket 102. In cases where the vertical landing apparatus 100 is integrated with a vertical landing vehicle with a relatively high center of gravity, the vertical landing apparatus 100 may comprise additional landing legs 160 to provide a more stable landing.

Alternatively, or in addition, a spacecraft that comprises the vertical landing apparatus 100 may produce less heat and/or consume less fuel during the landing process compared to one without the vertical landing apparatus 100. As described above with respect to FIG. 1C, a tilt angle 144 is the angle between the longitudinal axis 136 of the vertical landing apparatus 100 and the vertical projection 140 of the landing surface 360. The vertical landing apparatus 100 can allow for a stable landing within an allowable range of tilt angles 144 (e.g., 0 to 25 degrees). Because of this, one or more propulsion means of the spacecraft (e.g., thrusters, engines, motors, pneumatic pulsers, etc.) may not need to be activated for orientation purposes.

For example, while the booster rocket 102 of FIG. 1 descends toward the landing surface 360, thrusters 114 may be used to orient the booster rocket 102 so that it is perpendicular to the landing surface 360. The thrusters 114 may also be used to keep the booster rocket 102 perpendicular to the landing surface 360 while it descends. The use of the thrusters 114 for orientation purposes consumes substantial amounts of fuel. Moreover, a significant amount of heat is generated when the thrusters 114 are used for orientation purposes (which is worsened when the generated heat is reflected from the landing surface 360). Using the vertical landing apparatus 100 can allow for earlier motor shut-off because a stable landing can be achieved within an allowable range of tilt angles 144. In some cases, the only use of the spacecraft's motors (e.g., thrusters 114), while landing, is to slow the spacecraft to an acceptable landing speed (e.g., 3 to 5 m/s). As a result, less fuel may be consumed and/or less heat may be generated when using the vertical landing apparatus 100.

Alternatively or in addition to allowing for a stable landing on an uneven surface, and alternatively or in addition to simplifying the landing process, the vertical landing apparatus 100 may shorten the landing process. As previously described, during a landing process, spacecrafts commonly use one or more propulsion means (e.g., thrusters, pneumatic pulsers, engines, motors, etc.) with the help of sensors to orient the spacecraft (e.g., booster rocket) so that is perpendicular to the landing surface. This orientation process can take a significant amount of time due to the level of precision required. As previously described, the vertical landing apparatus 100 requires less precise alignment because the body 106 does not need to be perfectly perpendicular to the landing surface 360 to achieve a stable landing. A stable landing can be achieved within an allowable range of tilt angles 144 (see e.g., FIG. 1C). By not requiring the body 106 to be perpendicularly aligned with the landing surface 360, the vertical landing apparatus 100 can quicken the landing process.

Referring again to FIGS. 1A and 1B, the internal passage 120 of each leg housing 116 has an internal passage length 132. The internal passage length 132 may be measured between lower and upper ends of the internal passage 120. In the illustrated example, the internal passage length 132 is measured from the leg housing lower opening 124 to the leg housing upper opening 128.

In some examples, the leg length 172 of each landing leg 160 is at least 120% the internal passage length 132. More preferably, the leg length 172 of each landing leg 160 is at least 130% the internal passage length 132. In the illustrated example, the leg length 172 of each landing leg 160 is about 150% the internal passage length 132. The leg housings 116 may provide structural support to the landing legs 160. All else being equal, the longer the internal passage length 132, the greater the structural support the leg housing 116 can offer the respective landing leg 160. From a stability perspective, it may be preferable that at least 50% of each landing leg 160 be positioned within the respective leg housing 116 when in the deployed position. This can allow the vertical landing apparatus 110 to be used with spacecrafts and other vertical landing vehicles weighing over 5 tons. In other examples, at least two thirds of each landing leg 160 may be positioned within the respective leg housing 116 when in the deployed position.

With reference to FIGS. 1A and 1B, the leg lower end 168 of each landing leg 160 is longitudinally outboard of the body lower end 112 when the landing leg 160 in the deployed position (FIG. 1A) and the leg locking position (FIG. 1B). In other words, each landing leg 160 "sticks out" from the body lower end 112 regardless of whether the landing leg 160 is in the deployed or leg locking position.

Each landing leg 160 comprises a longitudinally outboard extent 192 from the body lower end 112 to the leg lower end 168. As shown with respect to the landing leg $160_3$, the longitudinally outboard extent 192 is longer when that landing leg $160_3$ is in the deployed position (FIG. 1A) than the leg locking position (FIG. 1B). In other words, each landing leg 160 sticks out less and less from the body lower end 112 as it translates toward the leg locking position.

In at least one embodiment, each landing leg 160 has a longitudinal translation displacement of at least 10% of the leg length 172 between its deployed and leg locking positions. More preferably, each landing leg 160 has a translation displacement of at least 20% (e.g., at least 25%, at least 30%, or more) of the leg length 172 between its deployed and leg locking positions. In some examples, any one of the landing legs 160 may translate at least 1 m (e.g., at least 2 m, at least 3 m, at least 4 m, at least 5 m, or more) between its deployed and leg locking positions. All else being equal, the longer the distance that each landing leg 160 can translate, the larger the differences in surface elevation between landing legs 160 that can be accommodated while landing.

In the illustrated example of FIGS. 1A-1C, the leg upper end 164 of each landing leg 160 is longitudinally outboard of a respective one of leg housing upper openings 128. As exemplified in FIG. 1A, the leg upper end 164 of each of the landing legs 160 may comprise a leg head 176 that is sized to prevent passage of the leg upper end 164 through the respective leg housing upper opening 128. In this manner, the leg heads 176 may prevent disengagement of the landing leg 160 from its respective leg housing 116. The leg heads 176 may be alternatively referred to herein as "translation stops" because they prevent further downward translation of the landing lands 160 beyond the deployed position.

Referring to FIG. 1C, the leg lower end 168 of each landing leg 160 optionally comprises a pivotable landing surface engagement foot 200. As shown, the pivotable landing surface engagement foot 200 conforms to the landing surface 360 independent of the orientation of the landing leg 160 relative to the landing surface 360. The pivotable landing surface engagement foot 200 can increase surface-to-surface contact between the leg lower ends 168 and the landing surface 360 and can thereby increase landing stability. The pivotable landing surface engagement foot 200 may pivotably connect to the respective landing leg 160 in any suitable manner, e.g., universal joint, ball and socket joint, etc. In alternative examples, the leg lower end 168 of each landing leg 160 may not comprise a pivotable landing surface engagement foot.

Reference is now made to FIGS. 3A-3E which schematically illustrate a landing sequence of the vertical landing apparatus 100, in accordance with an embodiment. It should be understood that these figures are schematic in nature and should not be interpreted to express precise dimensions of the vertical landing apparatus 100. For clarity of illustration, the body 106 of the vertical landing apparatus 100 is omitted from FIGS. 3A-3E.

FIGS. 3A-3E shows that each landing leg 160 is translatable within its respective leg housing 116 along a linear translation path 188 between a deployed position 180 and a leg locking position 184. As the vertical landing apparatus 100 descends relative a landing surface 360, each landing leg 160 translates upwardly along its translation path 188 (i.e., toward the leg locking position 184) in response its leg lower end 168 contacting the landing surface 360.

As shown, the vertical landing apparatus 100 comprises four leg locks $208_1$, $208_2$, $208_2$, $208_4$. Each leg lock $208_1$, $208_2$, $208_2$, $208_4$ is associated with a respective one of the landing legs $160_1$, $160_2$, $160_3$, $160_4$. Accordingly, the number of leg locks 208 may correspond to the number of landing legs 160. Each leg lock 208 is configured to move between a locked position in which translation of the respective landing leg 160 is prevented and a disengaged position in which translation of the respective landing leg 160 is allowed.

Each leg lock 208 may lock the respective landing leg 160 in any manner that prevents translation of the landing leg 160 within its leg housing 116. In the illustrated example of FIGS. 3A-3E, each landing leg 160 comprises a plurality of longitudinally distributed locking grooves 196. Each leg lock 208 engages one of the locking grooves 196 when in the locked position. As exemplified, each leg lock 208 may comprise a tooth 216 configured to mate with the locking grooves 196 on the landing legs 160. Such an engagement is robust, durable and can support a significant amount of weight. When mated with the leg lock 208, translation of the respective landing leg 160 is prevented. Conversely, when the leg locks 208 are in their disengaged position, the respective landing legs 160 can freely translate.

FIG. 8 illustrates another example of how the leg locks 208 can be configured to prevent translation of the landing legs 160. As shown, the leg lock 208 comprises four longitudinally distributed teeth 218. In other examples, there may be a greater or fewer number of the teeth 218 (although more teeth 218 may provide a stronger engagement). Each tooth 218 is configured to mate with a respective one of the locking grooves 196 on the landing leg 160. When mated with the leg lock 208, translation of the respective landing leg 160 is prevented. Conversely, when the leg lock 208 is in its disengaged position (as shown in FIG. 8), the respective landing leg 160 can freely translate.

As exemplified in FIG. 8, the plurality of longitudinally distributed locking grooves 196 may be provided on each side of the landing leg 160. Thus, landing legs 160 with a rectangular cross-section may have up to four sets of longitudinally distributed locking grooves 196—one on each side. Similarly, landing legs 160 with a hexagonal cross-section may have up to six sets of longitudinally distributed locking grooves 196—one on each side. Such a configuration may be advantageous in cases where the landing leg 160 is allowed to spin axially within its leg housing 116 because the leg lock 208 can engage within any one of the sets of locking grooves 196.

Each leg lock 208 can have any configuration that allows it to move from a disengaged position to a locked position. In the example of FIG. 8, the leg lock 208 slides between disengaged and locked positions. As shown, the leg lock 208 is slidably retained by a lock holder 222. Accordingly, the leg lock 208 can slide relative to the lock holder 222 when a force is applied (or removed). Although not shown on the schematic of FIG. 8, the lock holder 222 is coupled to the body 106 of the vertical landing apparatus 100. The leg lock 208 can be moved between disengaged and locked positions through the movement an actuator 248 (e.g., an electrical actuator, such as a solenoid, or a hydraulic actuator). In another example, the leg lock 208 may be configured as a clamp that tightens (e.g., squeezes) around the respective landing leg 160 when moved from a disengaged position to a locked position.

In the illustrated example of FIGS. 3A-3E, each leg lock 208 is rotatable about a respective lock rotation axis 212. Accordingly, in this example, each leg lock 208 can rotate about the lock rotation axis 212 between the disengaged and locked positions. Although not shown on the schematics of FIGS. 3A-3E, the leg locks 208 are rotatably coupled to the body 106 of the vertical landing apparatus 100.

Each leg lock 208 can have any position that allows it to engage (i.e., lock) the respective landing leg 160. As an example, the leg lock 208 may be positioned above the leg housing 116 and engage a portion of the respective landing leg 160 that extends outboard of the leg housing upper opening 128. As another example, the leg lock 208 may be positioned below the leg housing 116 and engage a portion of the respective landing leg 160 that extends outboard of the leg housing lower opening 124. In the illustrated example, the leg lock 208 is positioned midway between the leg housing lower and upper openings 124, 128 and engages the respective landing leg 160 through a leg lock engagement cutout 148 made in the leg housing 116.

The vertical landing apparatus 100 may comprise a plurality of leg position detectors. Each leg position detector may be associated with a respective one of the landing legs 160. Accordingly, the number of leg position detectors may correspond to the number of landing legs 160. The leg position detectors may be configured to detect when the respective landing leg 160 is in the leg locking position 184.

The leg position detectors can have any configuration that allows them to detect when the respective landing leg 160 is in its leg locking position 184. In the illustrated example of FIGS. 3A-3E, each leg position detector is a lever 232 that extends into the translation path 188 of the respective landing leg 160. As shown, each lever 232 has a lever leg end 240, an opposed lever cable end 244, and a lever fulcrum 236 intermediate of the lever leg end 240 and the lever cable end 244. Each lever 232 pivots about its lever fulcrum 236 in response to contact with the respective landing leg 160. Such contact occurs when the respective landing leg 160 is in the leg locking position 184. Accordingly, in this example, each lever $232_1$, $232_2$, $232_3$, $232_4$ can detect when the respective landing leg $160_1$, $160_2$, $160_3$, $160_4$ is in the leg locking position through physical contact.

The leg position detectors can have any position that allows them to detect when the respective landing leg 160 is in its leg locking position 184. As an example, each leg position detector may be positioned along a respective one of the leg housings 116 (i.e., somewhere between upper and lower ends of the leg housing 116). As another example, each leg position detector may be longitudinally spaced below a respective one of the leg housings 116. In the illustrated example, each leg position detector (e.g., lever 232) is longitudinally spaced above a respective one of the leg housing upper openings 128. Accordingly, in this example, the leg upper end 164 of each landing leg 160 contacts the lever leg end 240 of the respective lever 232 when the landing leg 160 is in its leg locking position 184. This contact pivots the lever 232 to about its lever fulcrum 236 (e.g., see FIG. 3E).

The vertical landing apparatus 100 may also comprise an actuator 248 that is coupled to each leg position detector (e.g., lever 232) and each leg lock 208. The actuator 248 is configured to move each leg lock 208 from the disengaged position to the locked position in response to one of the leg position detectors detecting that the respective landing leg 160 is in the leg locking position 184. Each leg position detector can be coupled to the actuator 248 in any manner that allows the leg position detector to communicate with the actuator 248 when the respective landing leg 160 is in the leg locking position 184. In the illustrated example, inlet cables 264 are used to couple the leg position detectors (e.g., levers 232) to the actuator 248.

Figure 3B:
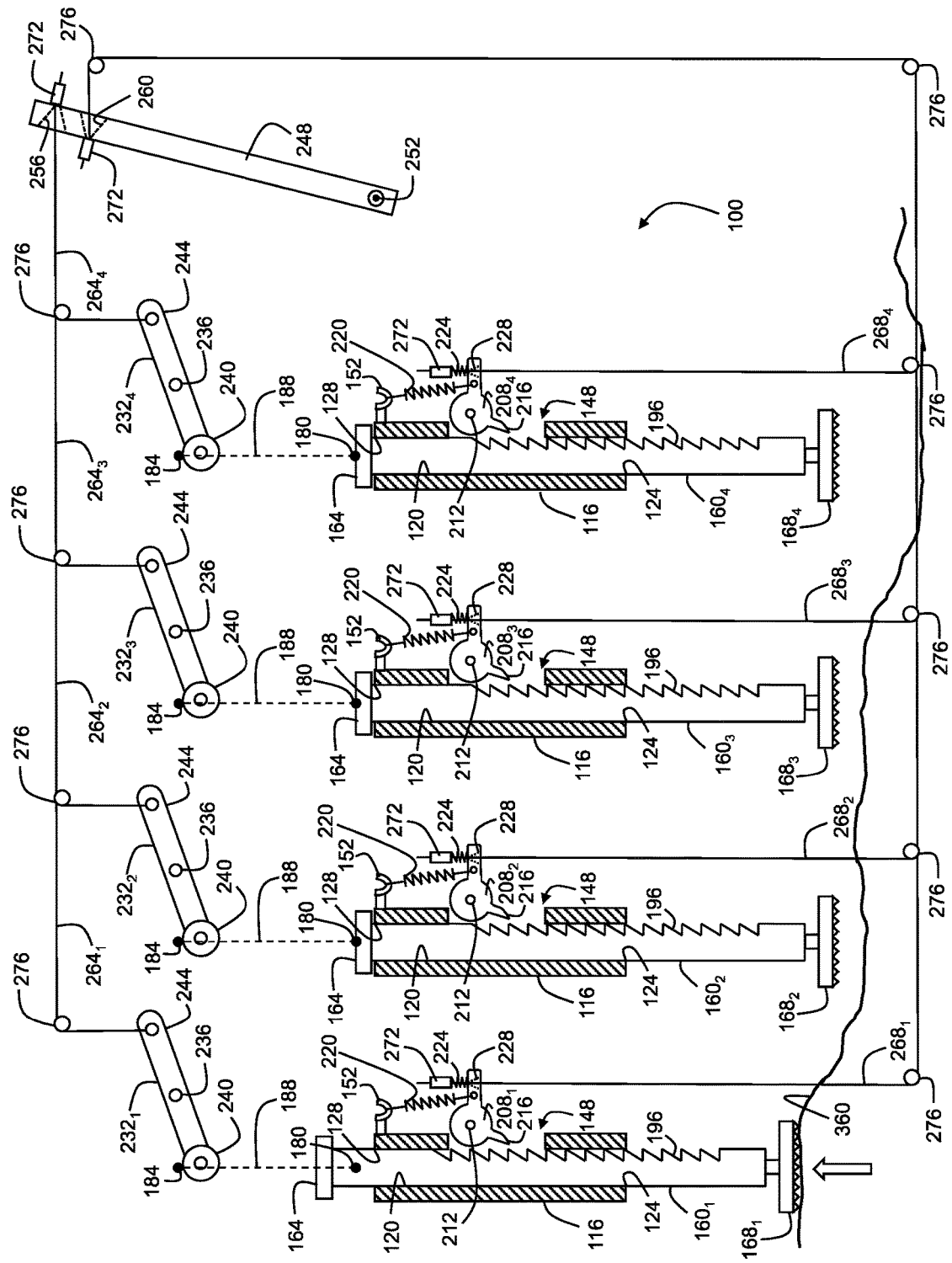
Figure 3C:
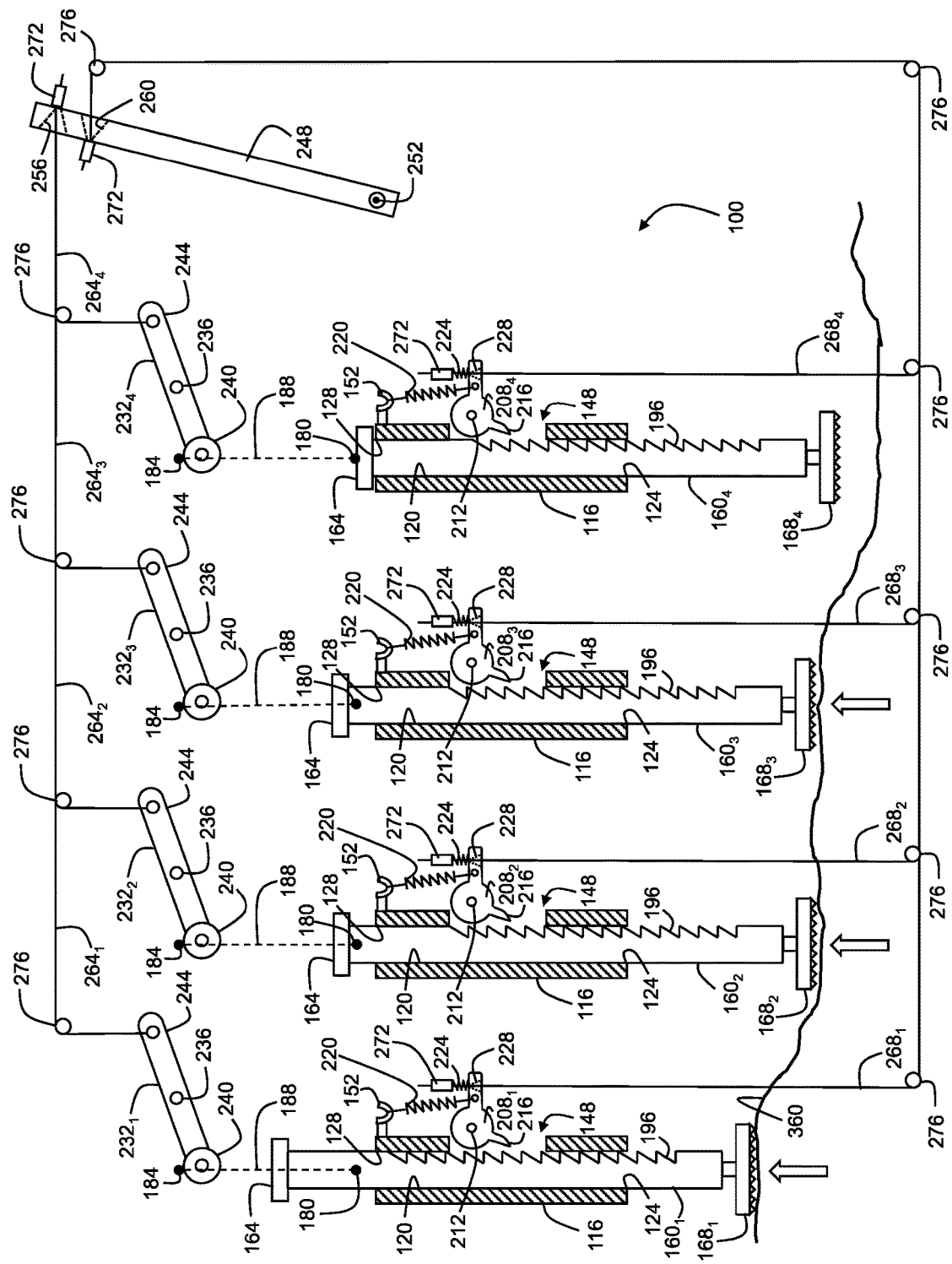
Figure 3D:
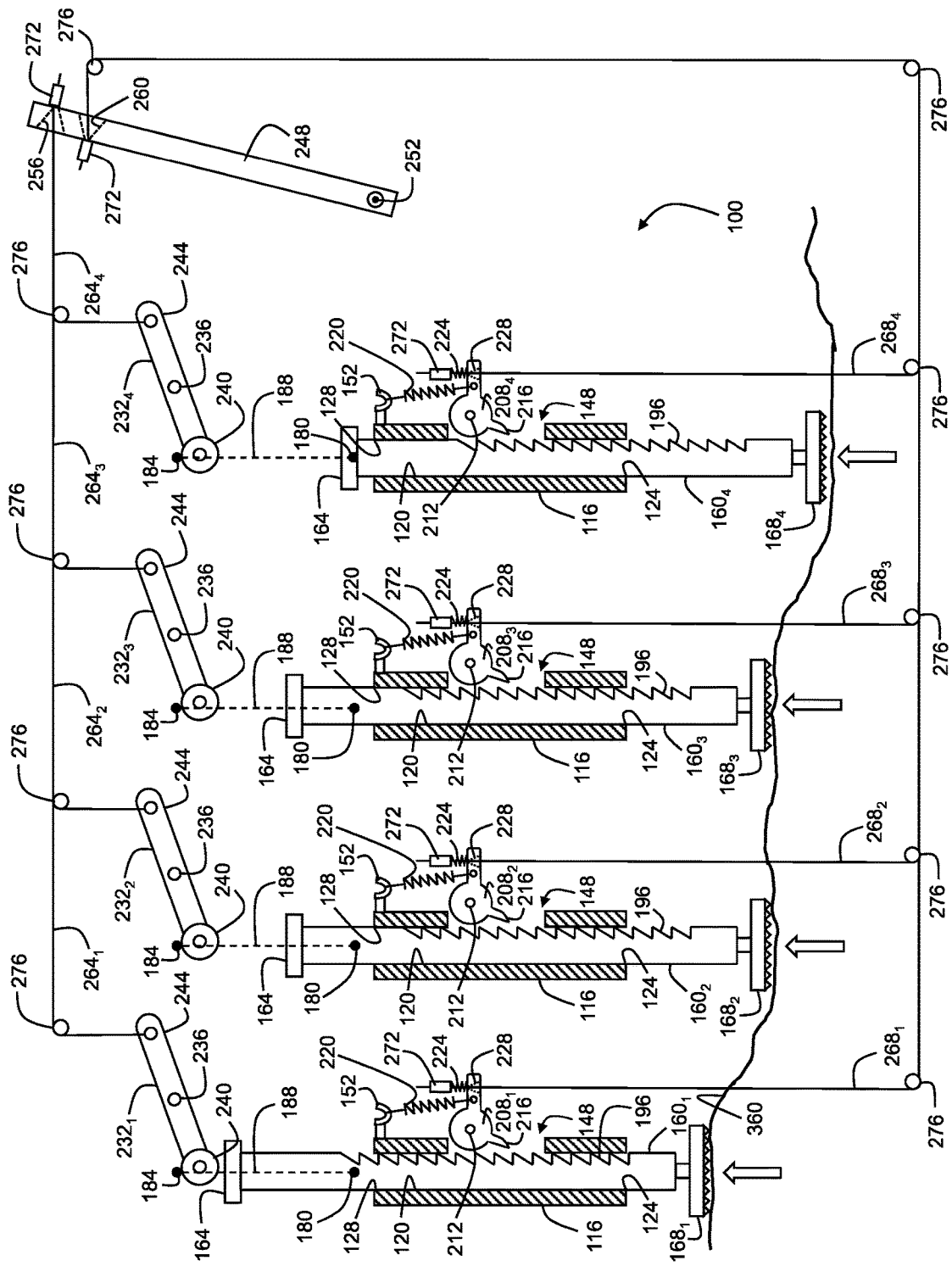
Figure 3E:
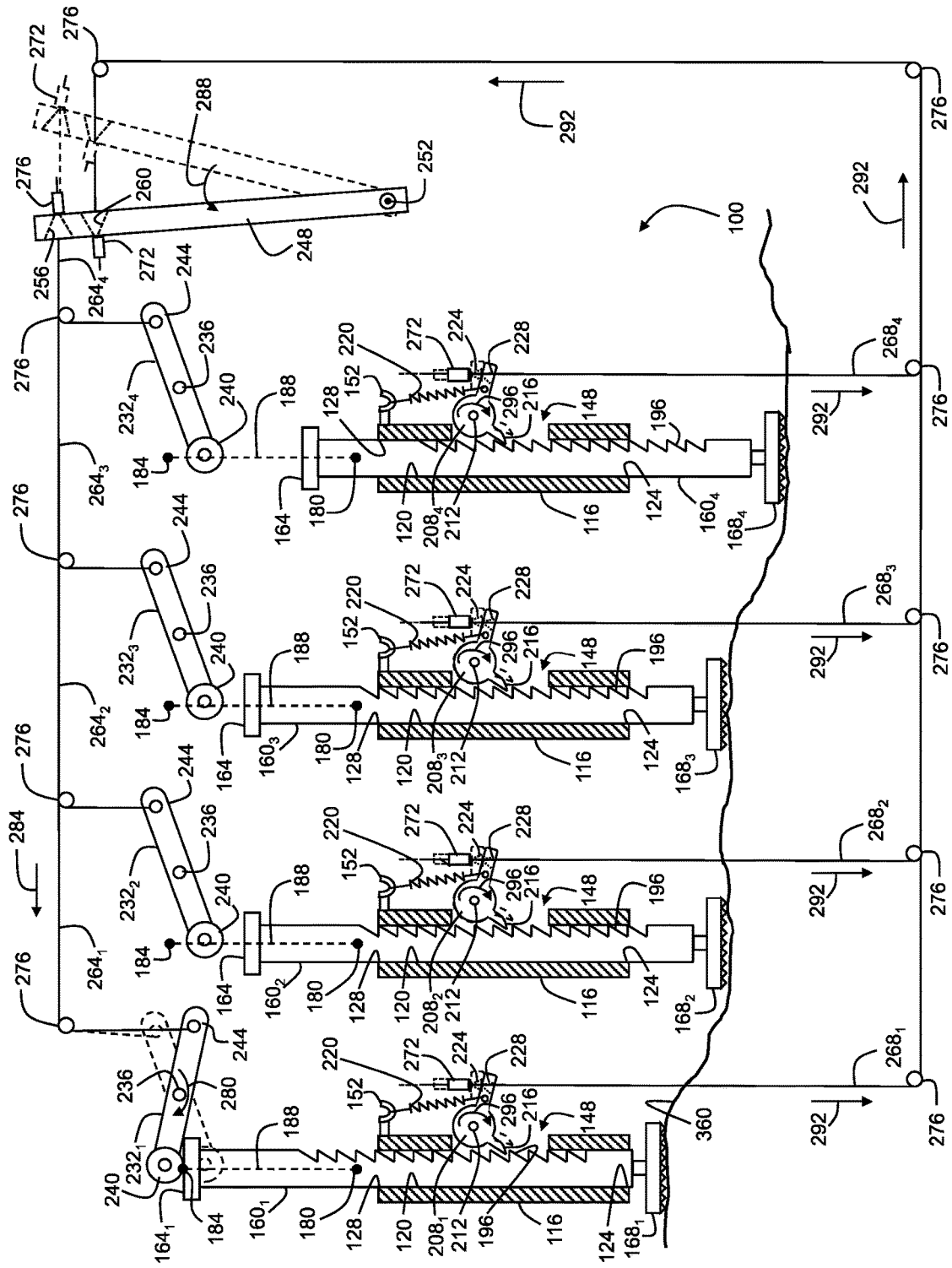
Figure 4:
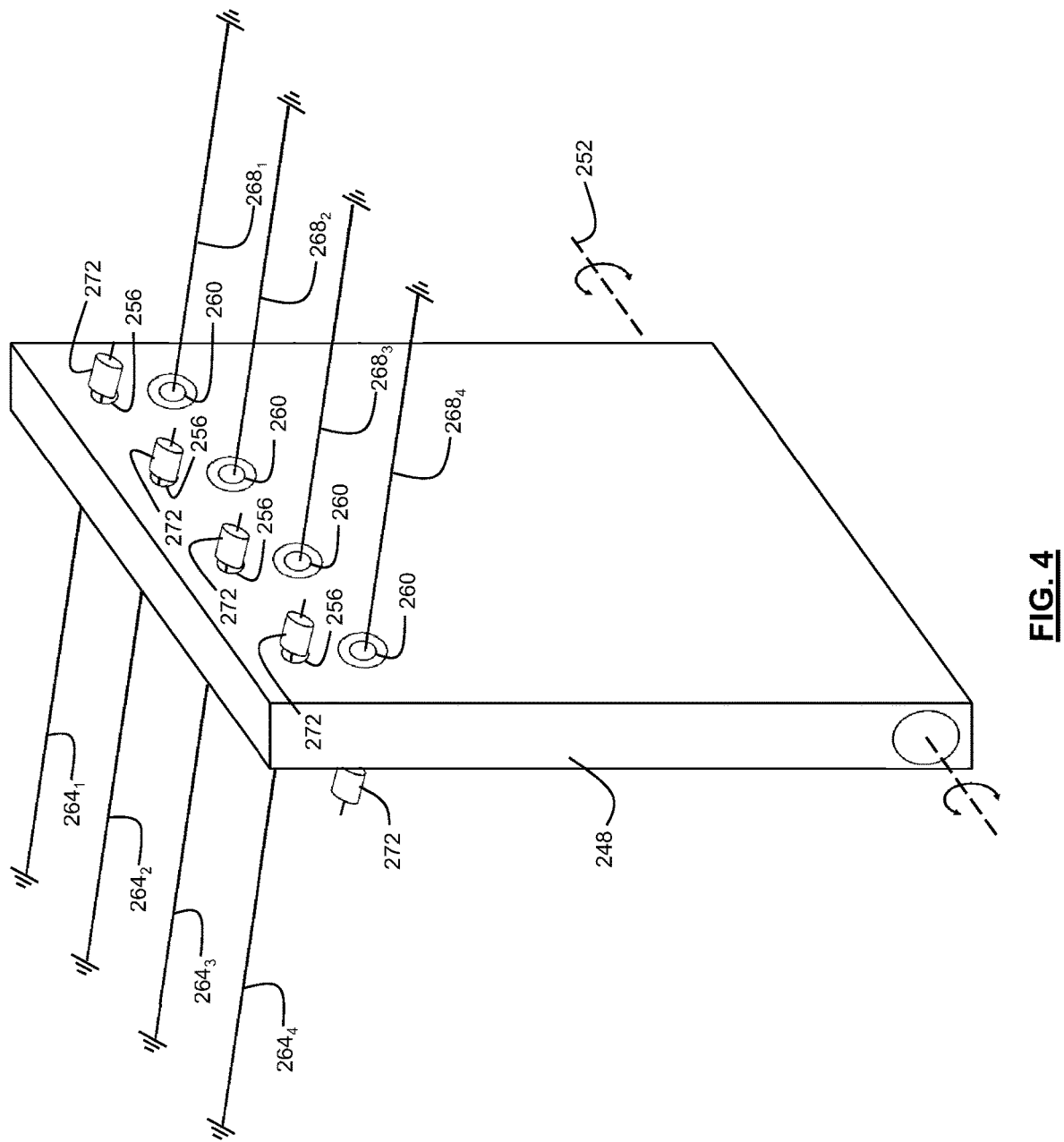
FIG. 4 is a perspective view of an actuator that may be used in the vertical landing apparatus of FIGS. 3A-3E.

With reference to FIGS. 3A and 4, each lever $232_1$, $232_2$, $232_3$, $232_4$ is coupled to the actuator 248 by a respective inlet cable $264_1$, $264_2$, $264_3$, $264_4$. The inlet cables $264_1$, $264_2$, $264_3$, $264_4$ appear as one continuous cable in FIGS. 3A-3E; however, as shown in FIG. 4, they are individual cables. One end of each inlet cable 264 is coupled to the respective lever 232 at the lever cable end 244. Referring specifically to FIG. 4, the other end of each inlet cable 264 is coupled to the actuator 248 at a respective inlet cable aperture 256. As shown, a cable cap 272 is attached to the end of each inlet cable 264 after it is passed through the respective inlet cable aperture 256. The cable caps 272 are sized to prevent the respective inlet cables 264 from decoupling with the actuator 248 (i.e., the cable caps 272 are larger than the inlet cable apertures 256). As exemplified, one or more pulleys 276 may be placed along each inlet cable 264 to route the inlet cable 264 from the respective lever 232 to the actuator 248.

Each leg lock 208 can be coupled to the actuator 248 in any manner that allows the leg lock 208 to move from the disengaged position to the locked position in response to actuation of the actuator 248. In the illustrated example, outlet cables 268 are used to couple each leg lock 208 to the actuator 248.

With reference to FIGS. 3A and 4, each leg lock $208_1$, $208_2$, $208_2$, $208_4$ is coupled to the actuator 248 by a respective outlet cable $268_1$, $268_2$, $268_3$, $268_4$. The outlet cables $268_1$, $268_2$, $268_3$, $268_4$ may appear as one continuous cable in FIGS. 3A-3E; however, as shown in FIG. 4, they are individual cables. One end of each outlet cable 268 is coupled to the respective leg lock 208 at a lock aperture 228. As shown, a cable cap 272 is attached to the end of each outlet cable 268 after it is passed through the respective lock aperture 228. The cable caps 272 are sized to prevent the outlet cables 268 from decoupling with respective leg locks 208 (i.e., the cable caps 272 are larger than the lock apertures 228). In the illustrated example, a spring 328 is located between leg lock 208 and the cable cap 272. As shown, the outlet cable 268 runs through the spring 328. In this arrangement, the spring 328 may act as a shock absorber. The spring 328 may dampen the force applied to the leg lock 208 through movement (e.g., pulling) of the respective outlet cable 268. In alternative examples, springs 328 may not be provided between the leg locks 208 and the cable caps 272.

The other end of each outlet cable 268 is coupled to the actuator 248 at a respective outlet cable aperture 260. Similarly, a cable cap 272 is attached to the end of each outlet cable 268 after it is passed through the respective outlet cable aperture 260. The cable caps 272 are sized to prevent the respective outlet cables 268 from decoupling with the actuator 248 (i.e., the cable caps 272 are larger than the outlet cable apertures 260). As exemplified, one or more pulleys 276 may be placed along the outlet cable 268 to route the outlet cable 268 from the actuator 248 to the respective leg lock 208.

As shown in FIGS. 3A-3E, the lock aperture 228 of each leg lock 208 is tapered (i.e., they are larger on their cable inlet end than their cable outlet end). Due to the tapering, each lock aperture 228 may avoid obstructive interference with the respective outlet cable 268 as the leg lock 208 rotates about its lock rotation axis 212. In alternative examples, the lock apertures 228 of leg locks 208 may not be tapered.

The actuator 248 can have any configuration that allows it to move each leg lock 208 from the from the disengaged position to the locked position. As shown, pivoting the actuator 248 about a pivot axis 252 can move (e.g., rotate) each leg lock 208 from the from the disengaged position to the locked position. As described above, when each leg lock 208 is in the locked position, translation of all landing legs 160 is prevented. Although not shown, the actuator 248 is rotatably coupled to the body 106 of the vertical landing apparatus 100.

Owing to the interconnection through the inlet cables $264_1$, $264_2$, $264_3$, $264_4$, pivoting any one of the levers $232_1$, $232_2$, $232_3$, $232_4$ about the respective lever fulcrum 236 causes the actuator 248 to pivot about its pivot axis 252. Owing to the interconnection through the outlet cables $268_1$, $268_2$, $268_3$, $268_4$, pivoting the actuator 248 about its pivot axis 252 causes each leg lock $208_1$, $208_2$, $208_2$, $208_4$ to rotate about the respective lock rotation axis 212 from its disengaged position to its locked position. In the result, the actuator 248 moves each leg lock 208₁, 208₂, 208₂, 208₄ from its disengaged position to its locked position in response to the pivoting of any one of the levers 232₁, 232₂, 232₃, 232₄ about its lever fulcrum 236.

As shown in FIGS. 3A-3E, the inlet cable and outlet cable apertures 256, 260 of the actuator 248 are tapered (i.e. they are larger on their cable inlet end than their cable outlet end). Due to the tapering, the cable apertures 256, 260 may avoid obstructive interference with respective inlet and outlet cables 264, 268 as the actuator 248 pivots about its pivot axis 252. In alternative examples, the inlet cable and outlet cable apertures 256, 260 of actuator 248 may not be tapered.

FIG. 3A illustrates the vertical landing apparatus 100 in a "pre-landing state", before any contact with the landing surface 360. As the vertical landing apparatus 100 descends toward the landing surface 360, each landing leg 160 is in its deployed position 180. Each leg lock 208 is shown in the unlocked position. In this state, each landing leg 160 is allowed to translate along the translation path 188 with respect to the corresponding leg housing 116.

FIG. 3B illustrates the vertical landing apparatus 100 in a "first leg contact state", shortly after the landing leg 160₁ has contacted the landing surface 360. In the illustrated example, the landing surface 360 is uneven (e.g., it generally slopes downwardly from left to right). The landing leg 160₁ is the first of the landing legs 160 to contact the landing surface 360 since the elevation of the landing surface 360 is highest in its location. While the vertical landing apparatus 100 continues descending toward the landing surface 360 (i.e. getting closer and closer to the landing surface 360), contact between the leg lower end 168₁ and the landing surface 360 translates the landing leg 160₁ upwardly along the translation path 188. Comparing FIG. 3B to FIG. 3A shows that the landing leg 160₁ has translated upwardly toward its leg locking position 184.

FIG. 3C illustrates the vertical landing apparatus 100 in an "intermediate landing state", shortly after the landing legs 160₂, 160₃ have contacted the landing surface 360. While the vertical landing apparatus 100 continues descending toward the landing surface 360, contact between the leg lower ends 168₂, 168₃ and the landing surface 360 translates the landing legs 160₂, 160₃ upwardly along their translation paths 188. Comparing FIG. 3C to FIG. 3B shows that the landing legs 160₂, 160₃ have translated upwardly toward their leg locking positions 184. The elevation of the landing surface 360 where the landing legs 160₂ and 160₃ have touched down is roughly the same. Accordingly, the landing legs 160₂ and 160₃ have translated upwardly by roughly the same distance along the translation path 188. Comparing FIG. 3C to FIG. 3B shows that the landing leg 160₁ has translated even farther toward its leg locking position 184. This is due to continued contact between the leg lower end 168₁ and the landing surface 360 as the vertical landing apparatus 100 continues descending.

FIG. 3D illustrates the vertical landing apparatus 100 in an "all-leg contact state", shortly after landing leg 160₄ has contacted the landing surface 360. The landing leg 160₄ is the last of the landing legs 160 to touch down on the landing surface 360 because the elevation of the landing surface 360 is lowest in its location. While the vertical landing apparatus 100 continues descending toward the landing surface 360, contact between the leg lower end 168₄ and the landing surface 360 translates the landing leg 160₄ upwardly along the translation path 188. Comparing FIG. 3D to FIG. 3C shows that the landing leg 160₄ has translated upwardly toward its leg locking position 184.

Comparing FIG. 3D to FIG. 3C shows that the landing legs 160₂, 160₃ have translated even farther toward their respective leg locking positions 184. This is due to continued contact between the leg lower ends 168₂, 168₃ and the landing surface 360 as the vertical landing apparatus 100 continues to descend. Comparing FIG. 3D to FIG. 3C shows that the landing leg 160₁ has translated even farther toward its leg locking position 184. Again, this is due to continued contact between the leg lower end 168₁ and the landing surface 360 as the vertical landing apparatus 100 continues descending. As shown in FIG. 3D, the landing leg 160₁ is close to reaching its leg locking position 184.

FIG. 3E illustrates the vertical landing apparatus 100 in a "fully landed state", shortly after the landing leg 160₁ has reached its leg locking position 184. As shown, each leg lock 208₁, 208₂, 208₂, 208₄ is now in its locked position. Accordingly, in this state, each landing leg 160 is prevented from translating along its translation path 188. Comparing FIG. 3E to FIG. 3D shows that landing leg 160₁ has translated to its leg locking position 184. This is due to continued contact between the leg lower end 168₁ and the landing surface 360 as the vertical landing apparatus 100 descends.

As shown in FIG. 3E, each leg lock 208 has rotated from its disengaged position to its locked position. When the landing leg 160₁ is in its leg locking position 184, contact between the leg upper end 164₁ and the lever 232₁ causes the lever 232₁ to pivot about its lever fulcrum 236 in a direction 280. Pivoting the lever 232₁ in the direction 280 causes the inlet cable 264₁ to be pulled in a direction 284. Pulling the inlet cable 264₁ in the direction 284 causes the actuator 248 to pivot about its pivot axis 252 in a direction 288. Pivoting the actuator 248 in the direction 288 causes each outlet cable 268₁, 268₂, 268₃, 268₄ to be pulled in a direction 292. Pulling each outlet cable 268₁, 268₂, 268₃, 268₄ in the direction 292 causes each leg lock 208₁, 208₂, 208₃, 208₄ to rotate about its lock rotation axis 212 in a direction 296 from its disengaged position to its locked position. In this way, each leg lock 208 has rotated from its disengaged position to its locked position in response to the landing leg 160₁ reaching its leg locking position 184.

Referring still to FIG. 3E, when the landing leg 160₁ is in its leg locking position 184, the other landing legs 160₂, 160₃, and 160₄ are locked in an intermediate position between their deployed and leg locking positions 180, 184 by respective leg lock 208₂, 208₃, and 208₄. In effect, each leg lock 208 is in its locked position when any one the landing legs (landing leg 160₁ in this case) is in the leg locking position 184. It will be appreciated that the exemplary landing sequence illustrated in FIGS. 3A-3E is based on the topography of the landing surface 360. Any one of the landing legs 160 may be the first to reach the leg locking position according to the given landing surface.

In some examples, each leg lock 208 is configured to move from the locked position to the disengaged position in response to any one of the landing legs 160 exiting (e.g., translating out of) the leg locking position 184. Referring to FIG. 3E, as an example, when the vertical landing apparatus 100 ascends relative to the landing surface 360, each leg lock 208 returns to the disengaged position once the landing leg 160₁ exits its leg locking position 184. Each leg lock 208 may be biased to its disengaged position. The leg locks 208 may be biased to the disengaged position with any suitable biasing member (e.g., springs, elastics, etc.). Biasing each leg lock 208 to its disengaged position may limit unintended movement of the leg locks 208 to the locked position. In the illustrated example, each leg lock 208 is biased to rotate toward the disengaged position by a biasing member (e.g., coil spring 220). In other examples, the biasing member may be an elastic band or another suitable biasing member.

As shown, each spring 220 has one end that is coupled to a respective leg housing 116 (via hook 152). The other end of the spring 220 is coupled to a respective leg lock 208. When the leg locks 208 are in the locked position (e.g., see FIG. 3E), the springs 220 are under tension. Accordingly, when the condition that caused the leg locks 208 to be in the locked position is lifted (e.g., landing legs $160_1$ translates downwardly out of its leg locking position), the tension in the springs 220 acts to return the leg locks 208 to their disengaged position (e.g., see FIG. 3D). This may provide one of more advantages. For example, it may facilitate landing on surfaces with lower gravity than the Earth (e.g., the Moon and Mars). Low gravity conditions tend to cause "bounce back" during landing (i.e., the spacecraft bounces off the landing surface while attempting landing). Bounce back may occur one or more times before a successful landing. The vertical landing apparatus 100 can accommodate for such bouncing because each leg lock 208 returns to the unlocked position when the vertical landing apparatus 100 bounces off the landing surface. In effect, the vertical landing apparatus 100 allows for multiple chances at a successful landing when bouncing occurs.

The exemplary landing sequence illustrated in the schematics of FIGS. 3A-3E is entirely mechanical in operation. In other words, no electrical components are used during the landing process. This may be advantageous when the vertical landing apparatus 100 is used on planets other than the Earth, which have unpredictable electromagnetic fields. Electronic parts may be unreliable in these cases.

Reference is now made to FIGS. 5A-5E which schematically illustrate a landing sequence of a vertical landing apparatus 100, in accordance with another embodiment. It should be understood that these figures are schematic in nature and should not be interpreted to express precise dimensions of the vertical landing apparatus 100. For clarity of illustration, the body 106 of the vertical landing apparatus 100 is omitted from FIGS. 5A-5E.

The vertical landing apparatus 100 shown in FIGS. 5A-5E is similar to the vertical landing apparatus 100 shown in FIGS. 3A-3E, except for the difference described below. Unless otherwise noted, like-numbered elements have similar structure and/or perform similar function as those in the vertical landing apparatus 100 in FIGS. 3A-3E.

As previously described, the vertical landing apparatus 100 may comprise a plurality of leg position detectors. Each leg position detector may be configured to detect when a respective one of the landing legs 160 is in its leg locking position 184. In the illustrated example of FIGS. 5A-5E, each leg position detector is an electrical switch 300 (e.g., a microswitch). As shown, each electrical switch 300 comprises a trigger 336 that extends into the translation path 188 of the respective landing leg 160.

Each trigger 336 is actuated (e.g., pushed upwardly) in response to contact with the respective landing leg 160. This contact occurs when the respective landing leg 160 is in its leg locking position 184. Accordingly, in this example, each electrical switch $300_1$, $300_2$, $300_3$, $300_4$ can detect when the respective landing leg $160_1$, $160_2$, $160_3$, $160_4$ is in the leg locking position through physical contact. In alternative examples, the electrical switches 300 may be sensors (e.g., optical and/or position sensors) which do not require physical contact for detection.

The electrical switches 300 can have any position that allows them to detect when the respective landing leg 160 is in its leg locking position 184. In the illustrated example, each electrical switch is longitudinally spaced above a respective one of the leg housing upper openings 128. Accordingly, in this example, the leg upper end 164 of each landing leg 160 contacts the trigger 336 of the respective switch 300 when the landing leg 160 is in its leg locking position 184. Such contact actuates the trigger 336. Upon actuation of the trigger 336, the electrical switch 300 is configured to transmit a lock signal to the actuator (e.g., solenoids 304). As described below, the solenoids 304 are configured to move each of the leg locks 208 from their disengaged position to their locked position in response to receiving the lock signal.

FIGS. 6A-6B illustrate an alternative position and configuration of electrical switch 300. The electrical switch 300 is secured to a respective leg housing 116. The landing leg 160 includes a switch engagement post 332. As shown, the switch engagement post 332 extends outwardly from the landing leg 160 and is sized to permit translation within an elongate slot 156 provided in the leg housing 116. The elongate slot 156 extends upwardly from the lower of the leg housing 116. The electrical switch 300 comprises a trigger 336 that extends into the translation path of the switch engagement post 332.

FIG. 6A shows the landing leg 160 in its deployed position. The switch engagement post 332 is longitudinally spaced apart from the trigger 336 of the electrical switch 300. FIG. 6B shows the landing leg 160 is its leg locking position. Comparing FIG. 6B to FIG. 6A shows that the landing leg 160 has translated upwardly within the leg housing 116. This is due to contact between the leg lower end 168 and the landing surface 360 as the vertical landing apparatus 100 descends. As shown in FIG. 6B, the switch engagement post 332 has actuated the trigger 336 (e.g., pushed the trigger 336 toward the main body of the electrical switch 300). In response to actuation of the trigger 336, the electrical switch 300 is configured to transmit a lock signal to the actuator (e.g., solenoids 304).

In the schematics of FIGS. 5A-5E, the actuator comprises four solenoids $304_1$, $304_2$, $304_3$, $304_4$. Each solenoid $304_1$, $304_2$, $304_3$, $304_4$ is associated with a respective one of the leg locks $208_1$, $208_2$, $208_3$, $208_4$. Accordingly, the number of solenoids 304 may correspond to the number of leg locks 208. Each solenoid $304_1$, $304_2$, $304_3$, $304_4$ is configured to move respective leg lock $208_1$, $208_2$, $208_3$, $208_4$ from its disengaged position to its locked position in response to receiving a lock signal from any one of the electrical switches $300_1$, $300_2$, $300_3$, $300_4$.

Each electrical switch 300 may be connected to each solenoid 304 through a wired connection (e.g., USB, JTAG, FTDI, etc.) or a wireless connection (e.g., wireless access network, Bluetooth®, etc.). These connections can allow each electrical switch 300 to communicate and/or relay signals with each solenoid 304. Wired connections are illustrated in the schematics of FIGS. 5A-5E.

The schematics of FIGS. 5A-5E illustrate that each electrical switch 300 and each solenoid 304 are coupled to a common energy storage member 308 (e.g., battery or supercapacitor). The energy storage member 308 supplies the electrical switches 300 and the solenoids 304 with operating power. In alternative examples, more energy storage members 308 may be provided. For example, each electrical switch 300 and/or each solenoid 304 may have their own integrated energy storage member.

Each solenoid 304 can be coupled to the respective leg lock 208 in any manner that allows the solenoid 304 to move the leg lock 208 from its disengaged position to its locked position. In the illustrated example, each solenoid 304 is coupled to the respective leg lock 208 through a block 316 and link cable 340. The solenoid 304 comprises a plunger 312 that actuates (e.g., retracts) in response to receiving the lock signal. The plunger 312 is fixed to the block 316 such that the plunger 312 and the block 316 move as one.

Each block 316 comprises a block aperture 320 through which one end the link cable 340 is passed. As shown, a cable cap 272 is attached to the end of each link cable 340 after it is passed through the respective block aperture 320. The cable caps 272 are sized to prevent the link cables 340 from decoupling with respective blocks 316 (i.e., the cable caps 272 are larger than the block apertures 320). The other end of the link cable 340 is coupled to the respective leg lock 208 at the lock aperture 228. As shown, a cable cap 272 is attached to the end of each cable 340 after it is passed through the respective lock aperture 228. Similarly, the cable caps 272 are sized to prevent the cables 268 from decoupling with respective leg locks 208 (i.e. the cable caps 272 are larger than the lock apertures 228). In an alternative embodiment, the plunger 312 of each solenoid 304 may be coupled directly to the respective link cable 340 (i.e., not through block 316).

As shown in FIGS. 5A-5E, the lock apertures 228 of leg locks 208 are tapered (i.e., they are larger on their cable inlet end than their cable outlet end). Due to the tapering, each lock aperture 228 may avoid obstructive interference with the respective link cable 340 as the leg lock 208 rotates about its lock rotation axis 212. In alternative examples, the lock apertures 228 of leg locks 208 may not be tapered.

Owing to the interconnection through the block 316 and link cable 340, retracting the plunger 312 causes each leg lock 208 to rotate about its lock rotation axis 212 from the disengaged position to the locked position. In the result, the solenoids $304_1$, $304_2$, $304_3$, $304_4$ can move respective leg locks $208_1$, $208_2$, $208_2$, $208_4$ from the disengaged position to the locked position in response to receiving the lock signal from any one of the electrical switches $300_1$, $300_2$, $300_3$, $300_4$.

Figure 5A:
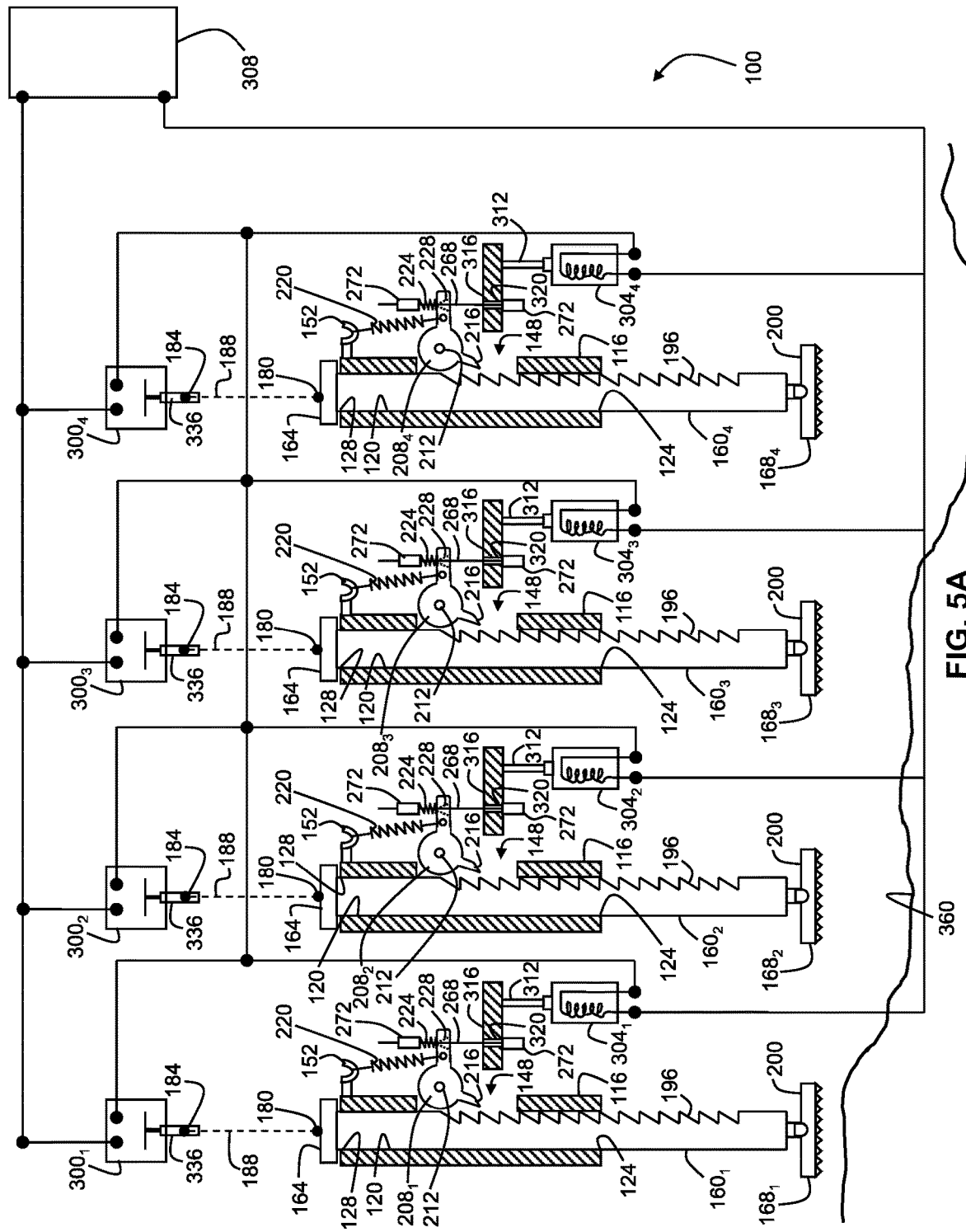

FIG. 5A illustrates the vertical landing apparatus 100 in a "pre-landing state", before any contact with the landing surface 360. As the vertical landing apparatus 100 descends toward the landing surface 360, each landing leg 160 is in its deployed position 180. Each leg lock 208 is shown in its unlocked position. Accordingly, in this state, each landing leg 160 is allowed to translate along its translation path 188 with respect to the respective leg housing 116.

FIG. 5B illustrates the vertical landing apparatus 100 in a "first leg contact state", shortly after the landing leg $160_4$ has contacted the landing surface 360. In the illustrated example, the landing surface 360 is uneven (e.g., it generally slopes upwardly from left to right). The landing leg $160_4$ is the first of the landing legs 160 to contact the landing surface 360 since the elevation of the landing surface 360 is highest in its location. While the vertical landing apparatus 100 continues descending toward the landing surface 360 (i.e., getting closer and closer to the landing surface 360), contact between the leg lower end $168_4$ and the landing surface 360 translates the landing leg $160_4$ upwardly along its translation path 188. Comparing FIG. 5B to FIG. 5A shows that the landing leg $160_4$ has translated upwardly toward its leg locking position 184.

Figure 5C:
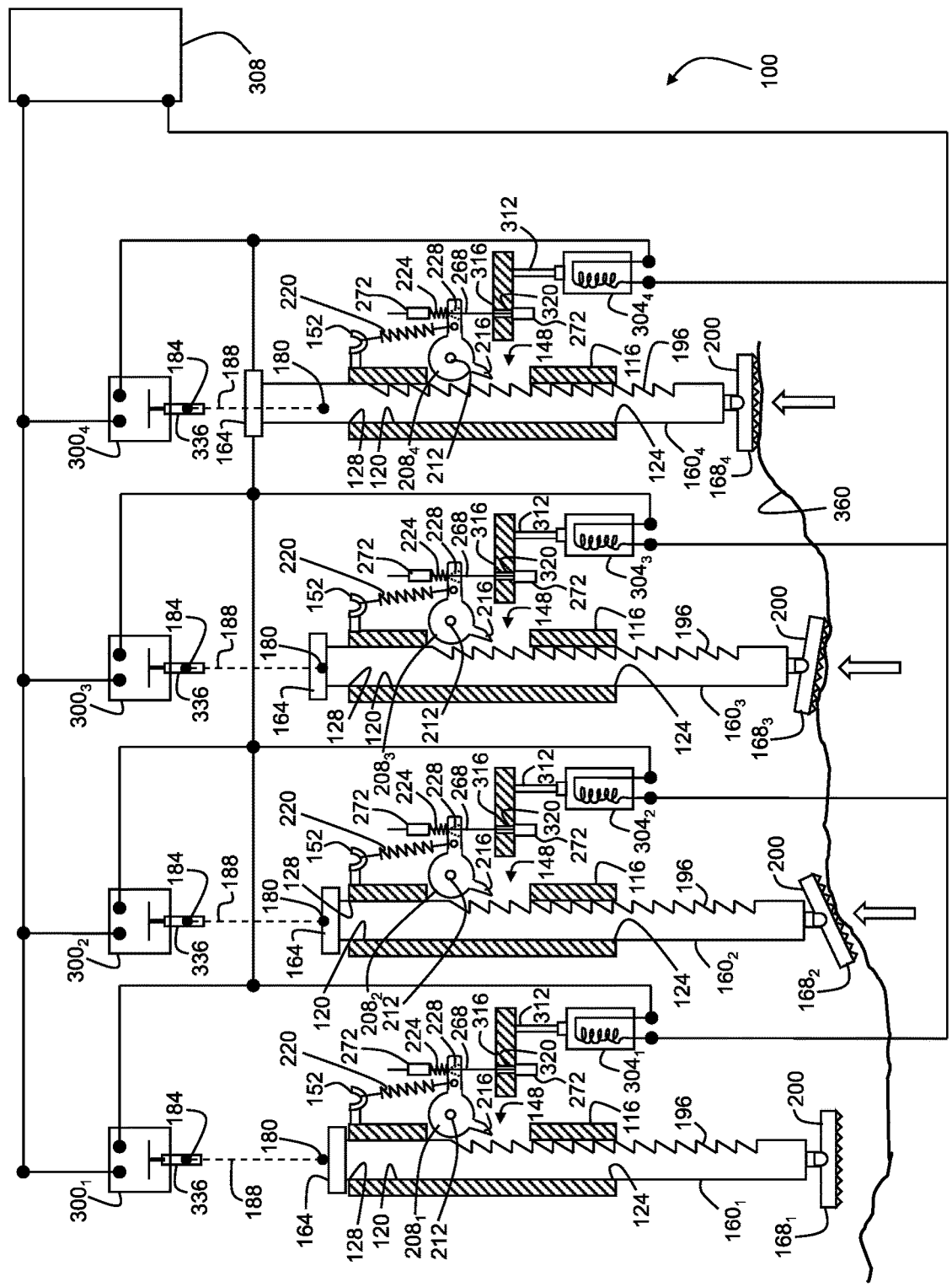

FIG. 5C illustrates the vertical landing apparatus 100 in an "intermediate landing state", shortly after the landing legs $160_2$, $160_3$ have contacted the landing surface 360. While the vertical landing apparatus 100 continues descending toward the landing surface 360, contact between the leg lower ends $168_2$, $168_3$ and the landing surface 360 translates the landing legs $160_2$, $160_3$ upwardly along their translation paths 188. Comparing FIG. 5C to FIG. 5B shows that the landing legs $160_2$, $160_3$ have translated upwardly toward respective leg locking positions 184. The landing surface 360 has a slightly lower elevation where the landing leg $160_2$ touched down than where the landing leg $160_3$ touched down. Accordingly, the landing leg $160_3$ has translated upwardly by a slightly greater extent than the landing leg $160_2$. Comparing FIG. 5C to FIG. 5B shows that the landing leg $160_4$ has translated even farther toward its leg locking position 184. This is due to continued contact between the leg lower end $168_4$ and the landing surface 360 as the vertical landing apparatus 100 continues descending.

Figure 5D:
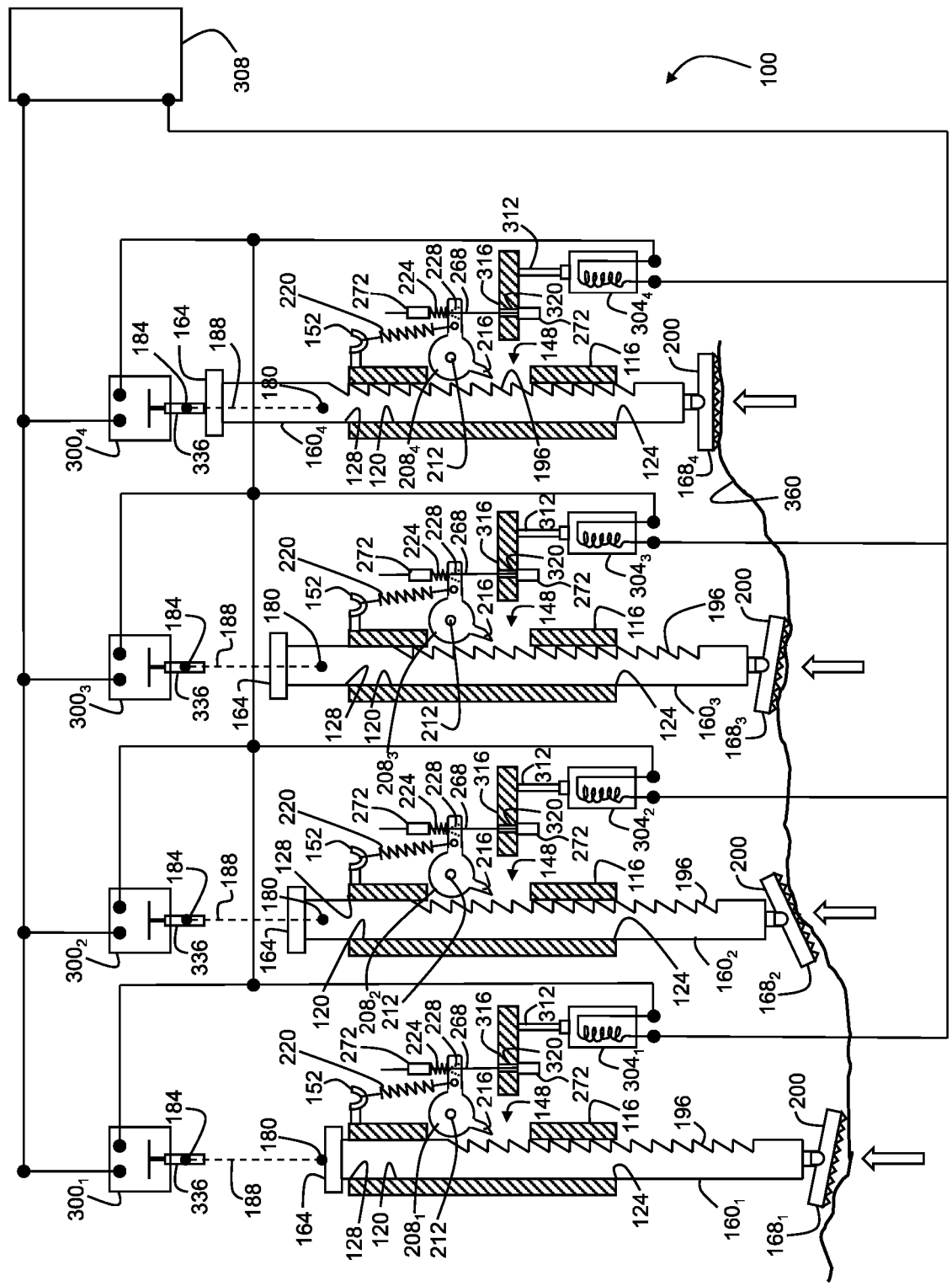

FIG. 5D illustrates the vertical landing apparatus 100 in an "all-leg contact state", shortly after landing leg $160_1$ has contacted the landing surface 360. The landing leg $160_1$ is the last of the landing legs 160 to touch down on the landing surface 360 because the elevation of the landing surface 360 is lowest in its location. While the vertical landing apparatus 100 continues descending toward the landing surface 360, contact between the leg lower end $168_1$ and the landing surface 360 translates the landing leg $160_1$ upwardly along its translation path 188. Comparing FIG. 5D to FIG. 5C shows that the landing leg $160_1$ has translated slightly toward its leg locking position 184.

Comparing FIG. 5D to FIG. 5C shows that the landing legs $160_2$, $160_3$ have translated even farther toward their respective leg locking positions 184. This is due to continued contact between the leg lower ends $168_2$, $168_3$ and the landing surface 360 as the vertical landing apparatus 100 continues descending. Comparing FIG. 5D to FIG. 5C shows that the landing leg $160_4$ has translated even farther toward its leg locking position 184. Again, this is due to continued contact between the leg lower end $168_4$ and the landing surface 360 as the vertical landing apparatus 100 continues descending. As shown in FIG. 5D, the landing leg $160_4$ is close to reaching its leg locking position 184.

Figure 5E:
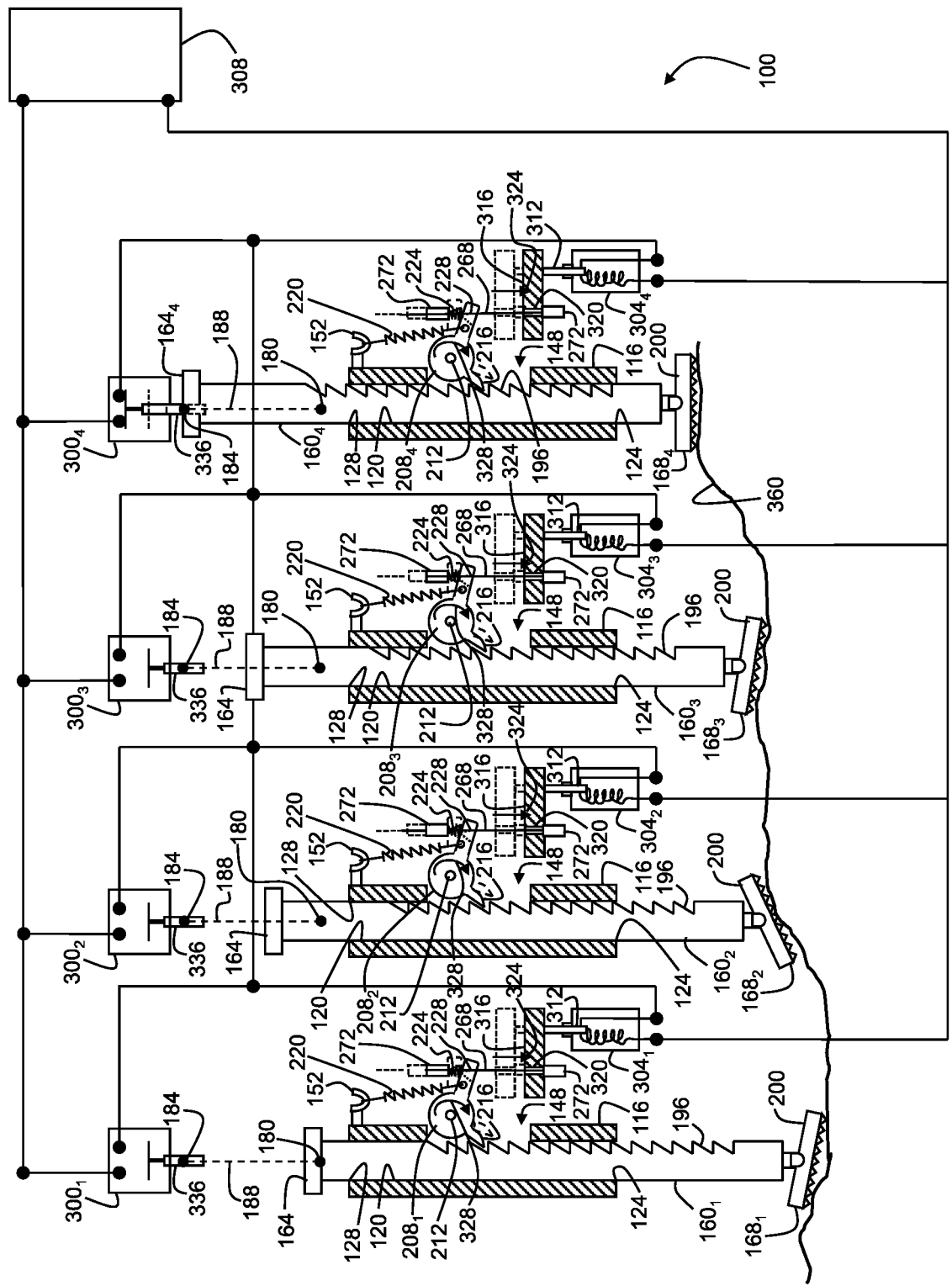

FIG. 5E illustrates the vertical landing apparatus 100 in a "fully landed state", shortly after the landing leg $160_4$ has reached its leg locking position 184. As shown, each leg lock $208_1$, $208_2$, $208_2$, $208_4$ is now in its locked position. In this state, each landing leg 160 is prevented from translating along its translation path 188. Comparing FIG. 3E to FIG. 3D shows that the landing leg $160_4$ has translated to its leg locking position 184. This is due to continued contact between the leg lower end $168_4$ and the landing surface 360 as the vertical landing apparatus 100 descends.

As shown in FIG. 5E, each leg lock 208 has rotated from its disengaged position to its locked position. When the landing leg $160_4$ is in its leg locking position 184, the leg upper end $164_4$ actuates the trigger 336 of the electrical switch $300_1$. Actuation of the trigger 336 causes the electrical switch $300_1$ to transmit a lock signal to each solenoid $304_1$, $304_2$, $304_3$, $304_4$. In response to receiving the lock signal, the plunger 312 of each solenoid $304_1$, $304_2$, $304_3$, $304_4$ retracts. Retracting each plunger 312 causes each link cable 340 to be pulled in a direction 324. Pulling each link cable 340 in the direction 324 causes each leg lock $208_1$, $208_2$, $208_3$, $208_4$ to rotate about its lock rotation axis 212 in a direction 328 from its disengaged position to its locked position. In this way, each leg lock 208 has rotated from its disengaged position to its locked position in response to the landing leg $160_4$ reaching its leg locking position 184.

In some examples, each electrical switch 300 may be configured to send an unlock signal to each solenoid 304 when any one of the landing legs 160 exits (e.g., translates out of) its leg locking position 184. In response to receiving the unlock signal, each solenoid 304 may be configured to move (e.g., rotate) the respective leg lock 208 from its locked position to its disengaged position.

The exemplary landing sequence illustrated in the schematics of FIGS. 5A-5E uses some electrical components (e.g., electrical switches 300 and solenoids 304). For earth landings, electrical components are reliable because the earth's magnetic field is known and predictable. The use of electrical components in a landing operation may offer one or more advantages over an entirely mechanical operation (e.g., FIGS. 3A-3E). For example, electrical components may be more precise (e.g., have a higher sensitivity). Alternatively, or in addition, electrical components may be smaller than their mechanical counterparts. Alternatively, or in addition, electrical components may be lighter than their mechanical counterparts.

Figure 7:
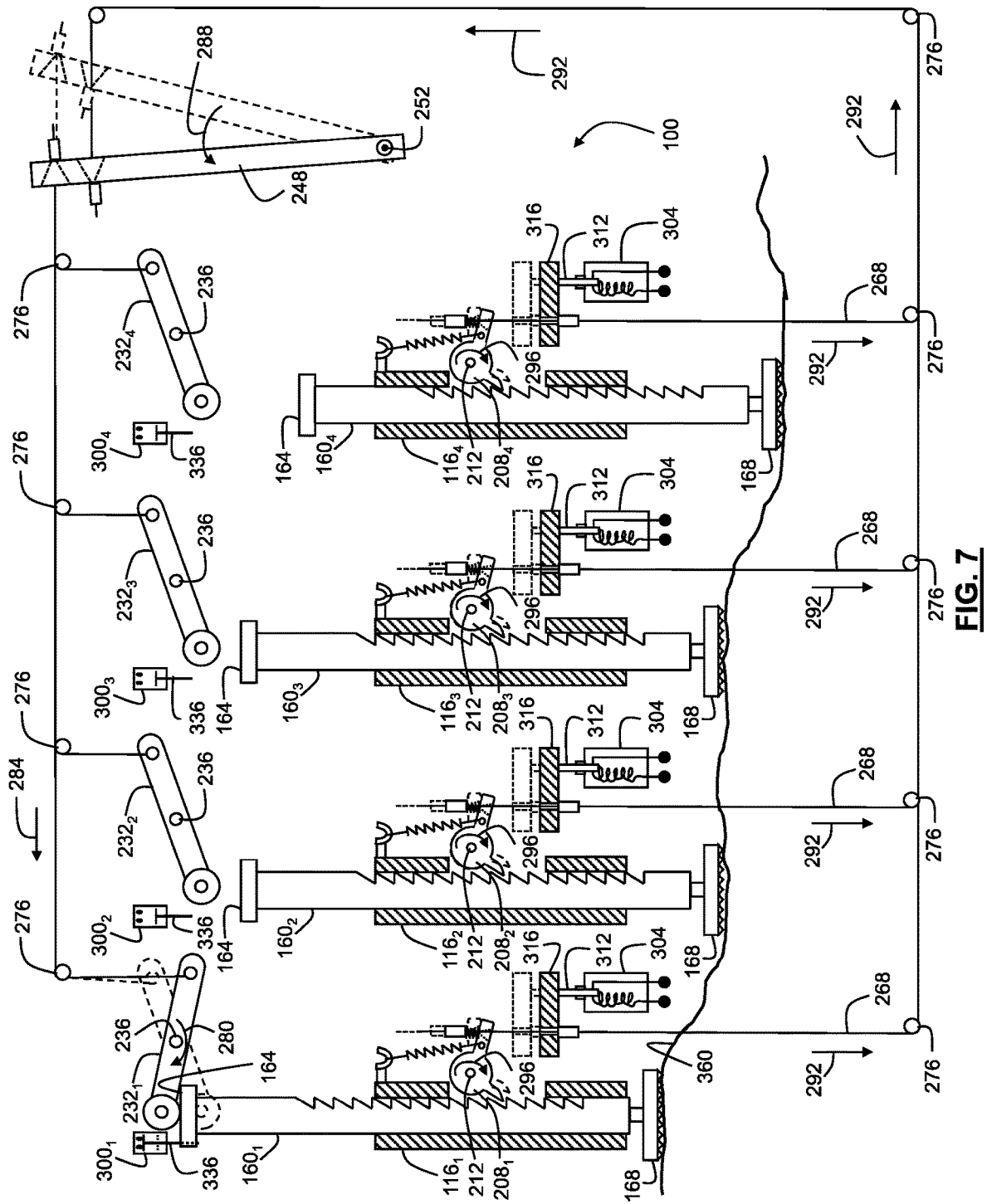
FIG. 7 is a partial schematic view of an example vertical landing apparatus that combines features of the vertical landing apparatuses of FIGS. 3A-3E and FIGS. 5A-5E.

The schematic of FIG. 7 illustrates a vertical landing apparatus 100, in accordance with an alternative embodiment. As shown, the vertical landing apparatus 100 of FIG. 7 combines the features of the vertical landing apparatuses of FIGS. 3A-3E and FIGS. 5A-5E. Like-numbered elements have similar structure and/or perform similar function as those in the vertical landing apparatus 100 in FIGS. 3A-3E and FIGS. 5A-5E. The electrical connections between the electrical switches 300 and the solenoids 304 are omitted for clarity of illustration.

FIG. 7 illustrates the vertical landing apparatus 100 in a "fully landed state", shortly after the landing leg $160_1$ has reached its leg locking position. As shown, each leg lock $208_1$, $208_2$, $208_2$, $208_4$ is now in its locked position. In this state, each landing leg 160 is prevented from translating with respect to its leg housing 116. As shown in FIG. 7, each leg lock 208 has rotated from its disengaged position to its locked position. When the landing leg $160_1$ is in its leg locking position, the leg upper end $164_1$ i) actuates the trigger 336 of the electrical switch $300_1$ and/or ii) pivots the lever $232_1$ about its lever fulcrum 236. It will be appreciated that the fully landed state illustrated in FIG. 7 is based on the topography of the landing surface 360. Any one of the landing legs 160 may be the first to reach the leg locking position according to the given landing surface.

The vertical landing apparatus 100 of FIG. 7 may be advantageous from a security perspective. For example, if one landing system fails, the other landing system may still operate to allow for a successful landing. Alternatively, or in addition, it may allow the selection of the landing system most suited to the type of landing (e.g., landing on the Moon vs landing on the Earth).

While the above description provides examples of one or more apparatuses or methods, it will be appreciated that other apparatuses or methods may be within the scope of the accompanying claims.

Items:

Item 1. A vertical landing apparatus, comprising:
a body comprising a body lower end and at least three leg housings, each of the leg housings comprising an internal passage extending longitudinally upwardly from a leg housing lower opening;
at least three landing legs, each of the landing legs being translatable within the internal passage of a respective one of the leg housings between a deployed position and a leg locking position, each of the landing legs comprising a leg lower end that is longitudinally outboard of the body lower end when in the deployed and leg locking positions, each of the landing legs comprising a longitudinally outboard extent from the body lower end to the lower leg end that is longer when in the deployed position than the leg locking position; and
at least three leg locks coupled to the body, each of the leg locks being associated with a respective one of the landing legs and configured to move between a locked position in which translation of the respective one of the landing legs is prevented and a disengaged position in which translation of the respective one of the landing legs is allowed,
wherein, as the apparatus descends relative to a landing surface, contact between the leg lower ends and the landing surface causes the landing legs to translate toward the leg locking position, and
wherein each of the leg locks is configured to move from the disengaged position to the locked position in response to a first one of the landing legs reaching the leg locking position.

Item 2. The vertical landing apparatus of any preceding item, wherein, when the first one of the landing legs is in the leg locking position, the other of the landing legs are locked in an intermediate position between the deployed and leg locking positions by a respective one of the leg locks.

Item 3. The vertical landing apparatus of any preceding item, wherein, as the apparatus ascends relative to the landing surface, each of the leg locks is configured to return to the disengaged position in response to the first one of the landing legs exiting the leg locking position.

Item 4. A vertical landing apparatus, comprising:
a body comprising a body lower end and at least three leg housings, each of the leg housings comprising an internal passage extending longitudinally upwardly from a leg housing lower opening;
at least three landing legs, each of the landing legs being translatable within the internal passage of a respective one of the leg housings between a deployed position and a leg locking position, each of the landing legs comprising a leg lower end that is longitudinally outboard of the body lower end when in the deployed and leg locking positions, each of the landing legs having a longitudinally outboard extent from the body lower end to the lower leg end that is longer when in the deployed position than the leg locking position; and
at least three leg locks coupled to the body, each of the leg locks being associated with a respective one of the landing legs and configured to move between a locked position in which translation of the respective one of the landing legs is prevented and a disengaged position in which translation of the respective one of the landing legs is allowed.

Item 5. The vertical landing apparatus of any preceding item, wherein, when one of the landing legs is in the leg locking position, the other of the landing legs are locked in an intermediate position between the deployed and leg locking positions by a respective one of the leg locks.

Item 6. The vertical landing apparatus of any preceding item, wherein each of the leg locks is in the locked position when one of the landing legs is in the leg locking position.

Item 7. The vertical landing apparatus of any preceding item, wherein each of the leg locks is configured to move from the disengaged position to the locked position in response to one of the landing legs reaching the leg locking position.

Item 8. The vertical landing apparatus of any preceding item, wherein each of the leg locks is configured to move from the locked position to the disengaged position in response to the one of the landing legs exiting the leg locking position.

Item 9. The vertical landing apparatus of any preceding item, wherein each of the leg locks is biased to the disengaged position.

Item 10. The vertical landing apparatus of any preceding item, comprising:
  at least three leg position detectors, each of the leg position detectors being associated with a corresponding one of the landing legs and configured to detect when the corresponding one of the landing legs is in the leg locking position; and
  an actuator coupled to each of the leg position detectors and each of the leg locks, wherein the actuator is configured to move each of the leg locks from the disengaged position to the locked position in response to one of the leg position detectors detecting that the corresponding one of the landing legs is in the leg locking position.

Item 11. The vertical landing apparatus of any preceding item, wherein each of the leg position detectors is a lever that extends into a translation path of the corresponding one of the landing legs and pivots in response to contact with the corresponding one of the landing legs.

Item 12. The vertical landing apparatus of any preceding item, wherein pivoting of any one of the levers causes the actuator to move each of the leg locks from the disengaged position to the locked position.

Item 13. The vertical landing apparatus of any preceding item, wherein each of the landing legs comprises a leg upper end that contacts a respective one of the levers when in the leg locking position.

Item 14. The vertical landing apparatus of any preceding item, wherein the internal passage of each of the leg housings extends longitudinally between the leg housing lower opening and a leg housing upper opening, and wherein each of the levers is longitudinally spaced above a respective one of the leg housing upper openings.

Item 15. The vertical landing apparatus of any preceding item, wherein each of the leg position detectors is an electrical switch that is communicatively coupled to the actuator, and wherein each of the electrical switches is configured to transmit a lock signal to the actuator when the corresponding one of the landing legs is in the leg locking position.

Item 16. The vertical landing apparatus of any preceding item, wherein the actuator is configured to move each of the leg locks from the disengaged position to the locked position in response to receiving the lock signal.

Item 17. The vertical landing apparatus of any preceding item, wherein the actuator comprises at least three solenoids, each of the solenoids being associated with a respective one of the leg locks and configured to move the respective one of the leg locks from the disengaged position to the locked position in response to receiving the lock signal.

Item 18. The vertical landing apparatus of any preceding item, wherein each of the electrical switches extends into a translation path of the corresponding one of the landing legs and is configured to transmit the lock signal to the actuator in response to contact with the corresponding one of the landing legs.

Item 19. The vertical landing apparatus of any preceding item, wherein each of the landing legs comprises an electrical switch engagement member that contacts a respective one of the electrical switches when in the leg locking position.

Item 20. The vertical landing apparatus of any preceding item, wherein each of the landing legs comprises a leg upper end, wherein each of the landing legs has a leg length between the leg upper and lower ends, and wherein each of the landing legs has a longitudinal displacement of at least 20% of the leg length between the deployed and leg locking positions.

Item 21. The vertical landing apparatus of any preceding item, wherein the leg length of each of the landing legs is at least 2 m.

Item 22. The vertical landing apparatus of any preceding item, wherein the internal passage of each of the leg housings extends longitudinally between the leg housing lower opening and a leg housing upper opening, wherein each of the leg housings have an internal passage length between the leg housing upper and lower openings, and wherein the leg length of each of the landing legs is at least 120% the internal passage length.

Item 23. The vertical landing apparatus of any preceding item, wherein each of the landing legs comprises a plurality of longitudinally distributed leg locking grooves, and wherein each of the leg locks engage one of the plurality of leg locking grooves when in the locked position.

Item 24. The vertical landing apparatus of any preceding item, wherein the leg lower end of each of the landing legs comprises a pivotable landing surface engagement foot.

Item 25. The vertical landing apparatus of any preceding item, wherein each of the leg locks is configured to rotate between the disengaged and locked positions.

Item 26. The vertical landing apparatus of any preceding item, wherein each of the leg locks is biased to rotate toward the disengaged position.

Item 27. The vertical landing apparatus of any preceding item, wherein the internal passage of each of the leg housings extends longitudinally between the leg housing lower opening and a leg housing upper opening, wherein the leg upper end of each of the landing legs is longitudinally outboard of a respective one of leg housing upper openings, and wherein the leg upper end of each of the landing legs comprises a leg head that is dimensioned to prevent passage of the leg upper end through the respective one of the leg housing upper openings.

Item 28. The vertical landing apparatus of any preceding item, wherein each of the landing legs is translatable independently of the other landing legs.

Item 29. The vertical landing apparatus of any preceding item, wherein the at least three leg housings are internal to the body and the leg housing lower opening of each of the leg housing coincides with the body lower end.

Item 30. The vertical landing apparatus of any preceding item, wherein the at least three leg housings are externally mounted to the body and distributed around an outer perimeter of the body.

Item 31. A spacecraft comprising the vertical landing apparatus of any preceding item.

Item 32. The spacecraft of any preceding item, wherein the spacecraft consists of a booster or a capsule.

Item 33. The spacecraft any preceding item, wherein the spacecraft has a weight of over 10 tons.

Item 34. A method of landing an apparatus comprising at least three landing legs, the method comprising:
  descending the apparatus relative to a landing surface;
  while said descending, contacting a lower end of each of the landing legs with the landing surface whereby each of the landing legs translate upwardly and independently of one another; and
  locking each of the landing legs in position when a first one of the landing legs reaches a leg locking position.

Item 35. The method of any preceding item, wherein said locking comprises preventing each of the landing legs from any further translation.

Item 36. The method of any preceding item, further comprising:

after said locking, ascending the apparatus relative to the landing surface; and while said ascending, unlocking each of landing legs when the first one of the landing legs exits the leg locking position due to downward translation.

Item 37. The method of any preceding item, wherein said unlocking comprises permitting each of the landing legs to translate upwardly and downwardly.

Item 38. The method of any preceding item, wherein the landing surface is uneven.

Item 39. The method of any preceding item, comprising:

after said locking, allowing a longitudinal axis of the apparatus to be orientated at angle greater than 5 degrees with respect to a vertical projection of the landing surface.

Item 40. The method of any preceding item, comprising:

before said contacting, translating each of the landing legs to a deployed position.

I claim:

1. A vertical landing apparatus, comprising:
   a body comprising a body lower end and at least three leg housings, each of the leg housings comprising an internal passage extending longitudinally upwardly from a leg housing lower opening, the internal passage of each of the leg housings having a fixed internal passage length;
   at least three landing legs, each of the landing legs having a fixed leg length, each of the landing legs being translatable within the internal passage of a respective one of the leg housings between a deployed position and a leg locking position, each of the landing legs comprising a leg lower end that is longitudinally outboard of the body lower end when in the deployed and leg locking positions, each of the landing legs having a longitudinally outboard extent from the leg housing lower opening to the lower leg end that is longer when in the deployed position than the leg locking position, each of the landing legs comprising a plurality of longitudinally distributed locking grooves; and
   at least three leg locks coupled to the body, each of the leg locks comprising at least one tooth, each of the leg locks being associated with a respective one of the landing legs and configured to move between a locked position, in which the at least one tooth of the leg lock mates with at least one of the plurality of locking grooves of the respective one of the landing legs to prevent translation of the respective one of the landing legs relative to the body, and a disengaged position, in which the at least one tooth of the leg lock is spaced apart from the at least one of the plurality of locking grooves of the respective one of the landing legs to allow the translation of the respective one of the landing legs relative to the body.

2. The vertical landing apparatus of claim 1, comprising:
   at least three leg position detectors, each of the leg position detectors being associated with a corresponding one of the landing legs and configured to detect when the corresponding one of the landing legs is in the leg locking position; and
   an actuator coupled to each of the leg position detectors and each of the leg locks, wherein the actuator is configured to move each of the leg locks from the disengaged position to the locked position in response to one of the leg position detectors detecting that the corresponding one of the landing legs is in the leg locking position.

3. The vertical landing apparatus of claim 2, wherein each of the leg position detectors is a lever that extends into a translation path of the corresponding one of the landing legs and pivots in response to contact with the corresponding one of the landing legs.

4. The vertical landing apparatus of claim 3, wherein pivoting of any one of the levers causes the actuator to move each of the leg locks from the disengaged position to the locked position.

5. The vertical landing apparatus of claim 2, wherein each of the leg position detectors is an electrical switch that is communicatively coupled to the actuator, and wherein each of the electrical switches is configured to transmit a lock signal to the actuator when the corresponding one of the landing legs is in the leg locking position.

6. The vertical landing apparatus of claim 5, wherein the actuator is configured to move each of the leg locks from the disengaged position to the locked position in response to receiving the lock signal.

7. The vertical landing apparatus of claim 5, wherein the actuator comprises at least three solenoids, each of the solenoids being associated with a respective one of the leg locks and configured to move the respective one of the leg locks from the disengaged position to the locked position in response to receiving the lock signal.

8. The vertical landing apparatus of claim 5, wherein each of the electrical switches extends into a translation path of the corresponding one of the landing legs and is configured to transmit the lock signal to the actuator in response to contact with the corresponding one of the landing legs.

9. The vertical landing apparatus of claim 1, wherein each of the landing legs comprise a leg upper end, wherein each of the landing legs has a leg length between the leg upper and lower ends, wherein each of the landing legs has a longitudinal displacement of at least 20% of the leg length between the deployed and leg locking positions, and wherein the leg length of each of the landing legs is at least 2 m.

10. The vertical landing apparatus of claim 9, wherein the internal passage of each of the leg housings extends longitudinally between the leg housing lower opening and a leg housing upper opening, wherein each of the leg housings have an internal passage length between the leg housing upper and lower openings, and wherein the leg length of each of the landing legs is at least 120% the internal passage length.

11. The vertical landing apparatus of claim 1, wherein each of the landing legs is translatable independently of the other landing legs.

12. The vertical landing apparatus of claim 1, wherein contact between the leg lower ends and a landing surface causes the landing legs to translate toward the leg locking position.

13. The vertical landing apparatus of claim 12, wherein each of the leg locks is configured to move from the disengaged position to the locked position in response to a first one of the landing legs reaching the leg locking position.

14. The vertical landing apparatus of claim 13, wherein, when the first one of the landing legs is in the leg locking position, the other of the landing legs are locked in an intermediate position between the deployed and leg locking positions by a respective one of the leg locks.

15. The vertical landing apparatus of claim 1, wherein each of the leg locks is configured to rotate about a lock rotation axis between the disengaged and locked positions.

16. The vertical landing apparatus of claim 1, wherein each of the leg locks is configured to move laterally between the disengaged and locked positions.

* * * * *